(12) United States Patent
Berstis

(10) Patent No.: US 7,995,474 B2
(45) Date of Patent: Aug. 9, 2011

(54) GRID NETWORK THROTTLE AND LOAD COLLECTOR

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 11/225,609

(22) Filed: Sep. 13, 2005

(65) Prior Publication Data

US 2007/0058547 A1  Mar. 15, 2007

(51) Int. Cl.
 *G01R 31/08* (2006.01)
(52) U.S. Cl. ........................................ 370/232; 370/231
(58) Field of Classification Search .................. 370/230, 370/230.1, 232, 255, 395.41, 235; 709/201, 709/224, 226; 707/200; 718/100, 104
See application file for complete search history.

(56) References Cited

U.S. PATENT DOCUMENTS

| | | | |
|---|---|---|---|
| 4,745,593 A | 5/1988 | Stewart | |
| 5,528,735 A | 6/1996 | Strasnick et al. | |
| 5,659,786 A | 8/1997 | George et al. | |
| 5,680,531 A | 10/1997 | Litwinowicz et al. | |
| 5,774,668 A | 6/1998 | Choquier et al. | |
| 5,828,879 A | 10/1998 | Bennett | |
| 6,006,299 A | 12/1999 | Wang et al. | |
| 6,195,622 B1 | 2/2001 | Altschuler et al. | |
| 6,269,376 B1 | 7/2001 | Dhillon et al. | |
| 6,321,181 B1 | 11/2001 | Havens | |
| 6,321,373 B1 | 11/2001 | Ekanadham et al. | |
| 6,324,656 B1 | 11/2001 | Gleichauf et al. | |
| 6,363,425 B1 | 3/2002 | Hook et al. | |
| 6,415,321 B1 | 7/2002 | Gleichauf et al. | |
| 6,460,068 B1 | 10/2002 | Novaes | |
| 6,480,194 B1 | 11/2002 | Sang'udi et al. | |
| 6,519,553 B1 | 2/2003 | Barnette et al. | |
| 6,539,445 B1 | 3/2003 | Krum | |
| 6,563,793 B1 | 5/2003 | Golden et al. | |
| 6,597,956 B1 | 7/2003 | Aziz et al. | |
| 6,618,818 B1 | 9/2003 | Wahl et al. | |
| 6,678,642 B1 | 1/2004 | Budge | |
| 6,687,693 B2 | 2/2004 | Cereghini et al. | |
| 6,694,345 B1 | 2/2004 | Brelsford et al. | |
| 6,959,405 B2 | 10/2005 | Hite et al. | |
| 6,988,090 B2 | 1/2006 | Yaginuma | |
| 7,003,559 B1 | 2/2006 | Nataraian et al. | |
| 7,274,658 B2 | 9/2007 | Bornstein et al. | |
| 7,292,533 B2 | 11/2007 | Park | |
| 7,302,482 B2 | 11/2007 | Rodosek et al. | |

(Continued)

OTHER PUBLICATIONS

"Condor Version 6.4.7 Manual", pp. 7, 9, 64, 68, 195 and 198, Jun. 2003 http://www.cs.wisc.edu/condor/manual/v6.4/condor-V6_4-Manual.pdf.

(Continued)

*Primary Examiner* — Aung S Moe
*Assistant Examiner* — Awet Haile
(74) *Attorney, Agent, or Firm* — Yee & Associates, P.C.; Mark C. Vallone

(57) ABSTRACT

A method and apparatus for a grid project throttle control for controlling the rate at which a grid job utilizes processor and network resources at the grid node. This throttling mechanism controls the rate of network and processor utilization based on a determination of the expected network and processor availability determined when a grid project is scheduled so that the grid project does not adversely affect the functioning of the nodes with regard to their regular, non-grid work.

16 Claims, 11 Drawing Sheets

U.S. PATENT DOCUMENTS

| | | | |
|---|---|---|---|
| 7,356,689 B2 | 4/2008 | Burch et al. | |
| 7,370,013 B1 | 5/2008 | Aziz et al. | |
| 7,831,971 B2 | 11/2010 | Berstis et al. | |
| 7,853,948 B2 | 12/2010 | Berstis et al. | |
| 2003/0018694 A1 | 1/2003 | Chen et al. | |
| 2003/0041164 A1* | 2/2003 | Denecheau et al. | 709/232 |
| 2003/0101167 A1* | 5/2003 | Berstis | 707/3 |
| 2003/0107988 A1* | 6/2003 | Lodha et al. | 370/229 |
| 2003/0110423 A1* | 6/2003 | Helms et al. | 714/100 |
| 2003/0200347 A1 | 10/2003 | Weitzman | |
| 2004/0019624 A1 | 1/2004 | Sukegawa | |
| 2004/0024673 A1 | 2/2004 | Huettl et al. | |
| 2004/0103339 A1 | 5/2004 | Chalasani et al. | |
| 2004/0120256 A1* | 6/2004 | Park | 370/235 |
| 2004/0123296 A1 | 6/2004 | Challenger et al. | |
| 2004/0225711 A1* | 11/2004 | Burnett et al. | 709/201 |
| 2005/0076113 A1 | 4/2005 | Klotz et al. | |
| 2005/0138175 A1* | 6/2005 | Kumar et al. | 709/226 |
| 2005/0155033 A1 | 7/2005 | Luoffo et al. | |
| 2005/0165854 A1* | 7/2005 | Burnett et al. | 707/200 |
| 2005/0283782 A1* | 12/2005 | Lu et al. | 718/100 |
| 2006/0041887 A1 | 2/2006 | Dusio | |
| 2006/0159021 A1 | 7/2006 | Asghar et al. | |
| 2006/0167634 A1* | 7/2006 | Cho et al. | 702/5 |
| 2006/0167966 A1* | 7/2006 | Kumar et al. | 709/201 |
| 2006/0294238 A1* | 12/2006 | Naik et al. | 709/226 |
| 2007/0106994 A1* | 5/2007 | Jackson | 718/104 |
| 2007/0118839 A1 | 5/2007 | Berstis et al. | |
| 2007/0220152 A1* | 9/2007 | Jackson | 709/226 |

OTHER PUBLICATIONS

Zangrilli et al, "Comparing passive network monitoring of grid applciation traffic with active probes", Grid Computing, 2003, Proceedings of fourth International Workshop Nov. 17, 2003, Piscataway, NJ, IEEE 2003, pp. 84-91.

"Method to Throttle Resource Communication Via Artificial CPU Consumption", IBM Research Disclosure, vol. 449, No. 78, Sep. 2001, pp. 1-5.

Wang et al., "Providing Network Monitoring Service for Grid Computing", Proceedings of 10th IEEE International Workshop on Future Trends of Distributed Computing Systems, May 2004, Suzhou, China and Piscataway, NJ, pp. 1-7.

Viktors, World community Grid CPU Throttle Feature, May 9, 2005, pp. 1-3. http://www.worldcommunitygrid.org/forums/wxg/printpost?post=17271.

Akioka et al., "Extended Forecast of CPU and Network Load on Computational Grid", IEEE International Symposium on Cluster Computing and the Grid, 2004, CCGRID2004, Chicago, USA, pp. 765-772.

Takefusa et al., "Overview of a Performance Evaluation System for Global Computing Scheduling Algorithms", Proceedings of the Eighth International Symposium on High Performance Distributed Computing, Aug. 1999, pp. 97-104.

"PC Pitstop Trace Route Utility", http://www.pcpitstop.com/internet/tracert.asp.

Berstis, Viktors, "Fundamentals of Grid Computing", Redbooks Paper, IBM Corporation, 2002, pp. 1-28.

U.S. Appl. No. 11/257,443, filed Oct. 24, 2005, Berstis et al.

U.S. Appl. No. 11/257,444, filed Oct. 24, 2005, Berstis et al.

U.S. Appl. No. 11/257,442, filed Oct. 24, 2005, Berstis et al.

USPTO Office Action for U.S. Appl. No. 11/257,443, dated Aug. 4, 2009.

Certificate of Translation.

Liang et al., "TCP Congestion Control in Grid Computing", China Data Communications, vol. 6, No. 10, 2004. (In English).

Liang et al.,"TCP Congestion Control in Grid Computing", China Data Communications, vol. 6, No. 10, 2004 (in Chinese).

Buyya, R., Currency and Computation: Practice and Experience, No. 14, Feb. 2002, pp. 1176-1219.

Simatos, C., The SimJava Tutorial [online], 2002. Retrieved from the Internet: <URL: http://www.isca.inf.ed.ac.uk/research/groups/hase/simjava/guide/tutorial.htm>.

OrCAD Pspice 9.2 Tutorial, Ohio University, School of Electrical and Computer Science. Retrieved from the Internet: <URL: http://www.ent.ohiou.edu/~webcad/ee616/PSPICE/PSPICE%20tutorial.htm>.

Eaton, B., Time Manager Module: Requirements and Design [online], Nov. 2001. Retrieved from the Internet: <URL: http://www.ccsm.ucar.edu/models/atm-cam/docs/time-manager/time-manager.htm>.

PSpice Release 9.2 Release Notes, May 2000. Retrieved from the Internet: <URL: http://notes.ump.edu.my/fkee/Rosmadi%20Abdullah/BEE2233/PSpice/HTML/psprl.htm>.

USPTO Office Action for U.S. Appl. No. 11/257,442 dated Dec. 10, 2009.

USPTO Final Office Action for U.S. Appl. No. 11/257,444 dated May 26, 2010.

USPTO Office Action for U.S. Appl. No. 11/257,443 dated Aug. 4, 2009.

USPTO Office Action for U.S. Appl. No. 11/225,609 dated Jun. 11, 2009.

USPTO office action for U.S. Appl. No. 12/136,353 dated Jan. 7, 2011.

USPTO office action dated Oct. 27, 2009 for U.S. Appl. No. 11/257,444 .

* cited by examiner

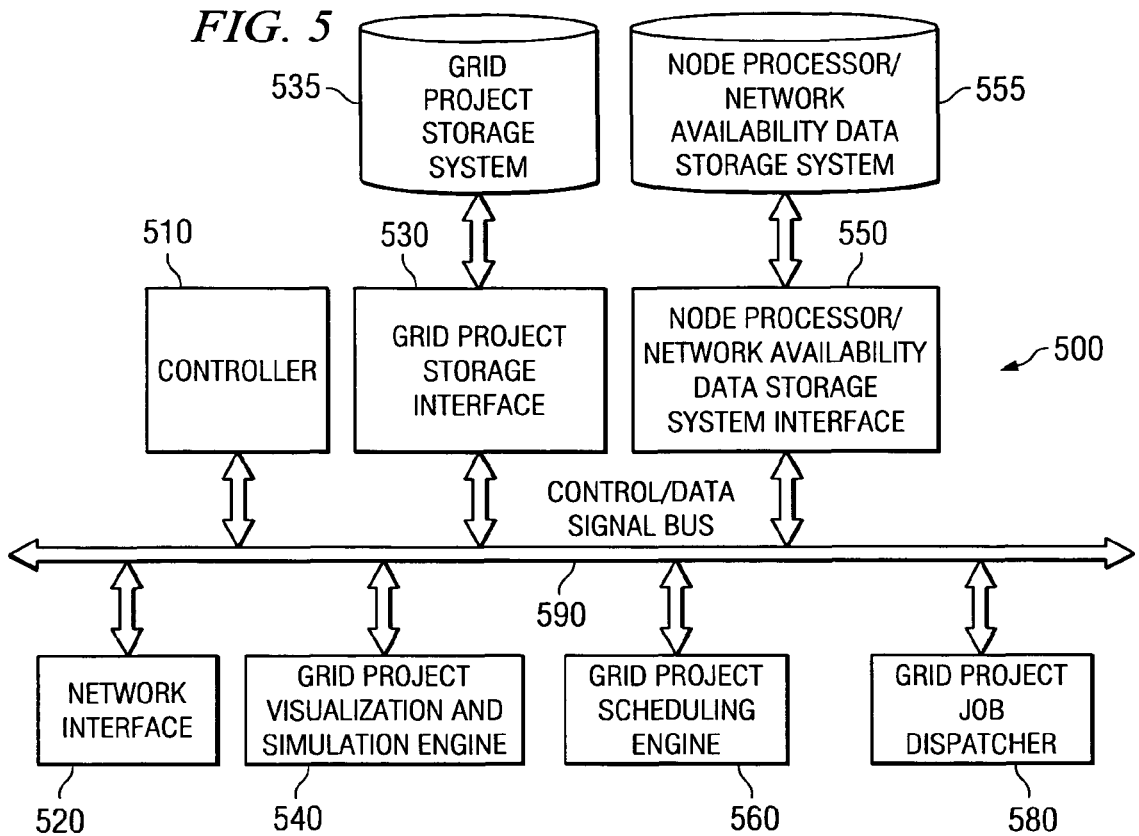
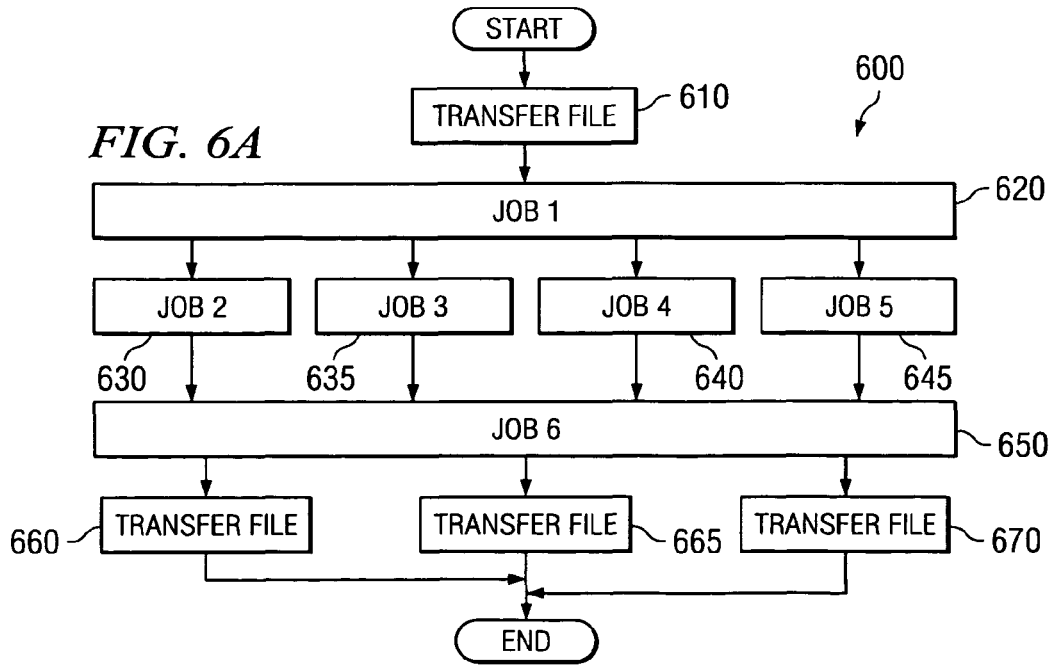

FIG. 6B

```
<application name = project x>
    <step>
        <xferfile from=location A to=locationB bytes=1234567890 >
    </step>
    <step>
        <Job name=1 cycles=10000000000....>
    </step>
    <step>
        <parallel>
            <Job name=2 ...>
            <Job name=3 ...>
            <Job name=4 ...>
            <Job name=5 ...>
        </parallel>
    </step>
    <step>
        <Job name=6 ...>
    </step>
    <step>
        <parallel>
            <xferfile from=locationC to=findlocationD ...>
            <xferfile ...>
            <xferfile ...>
        </parallel>
    </step>
</application>
```

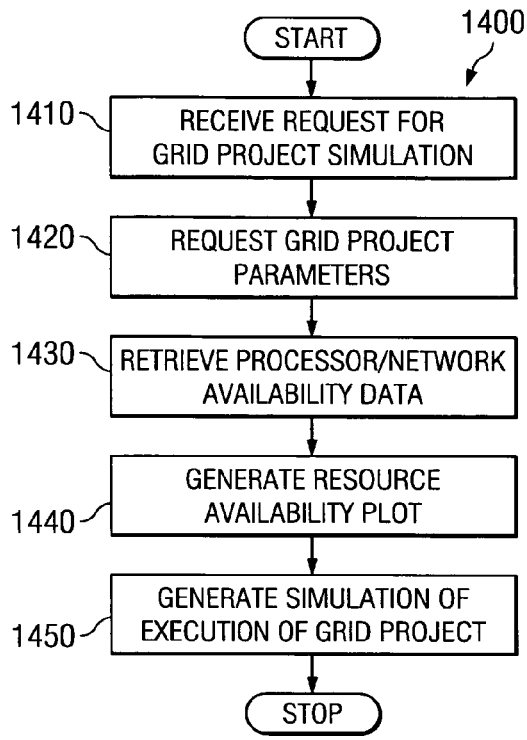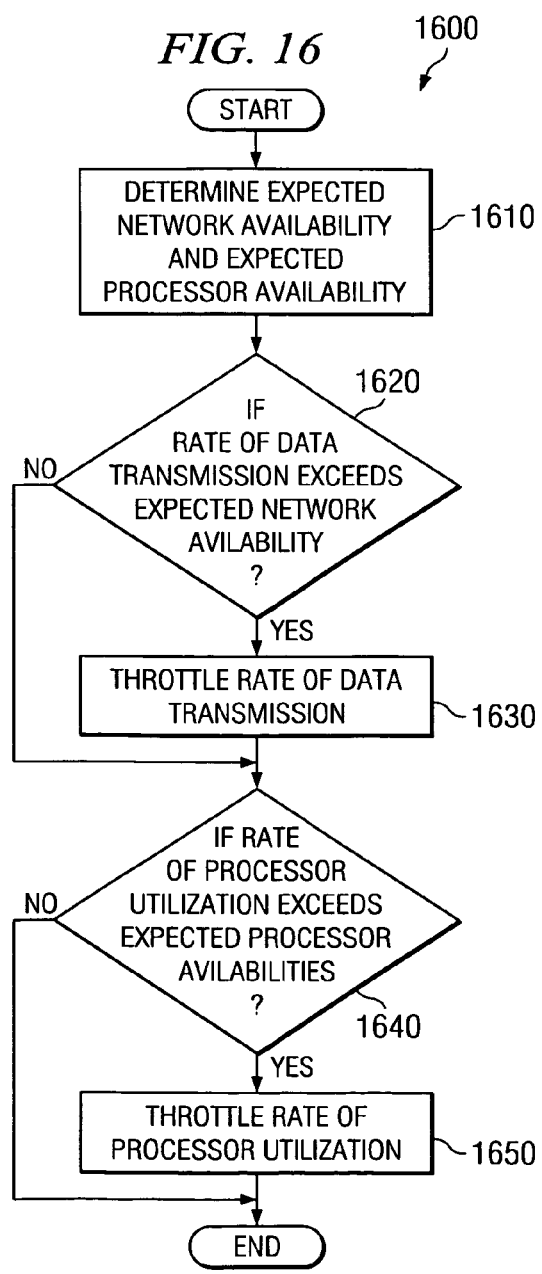

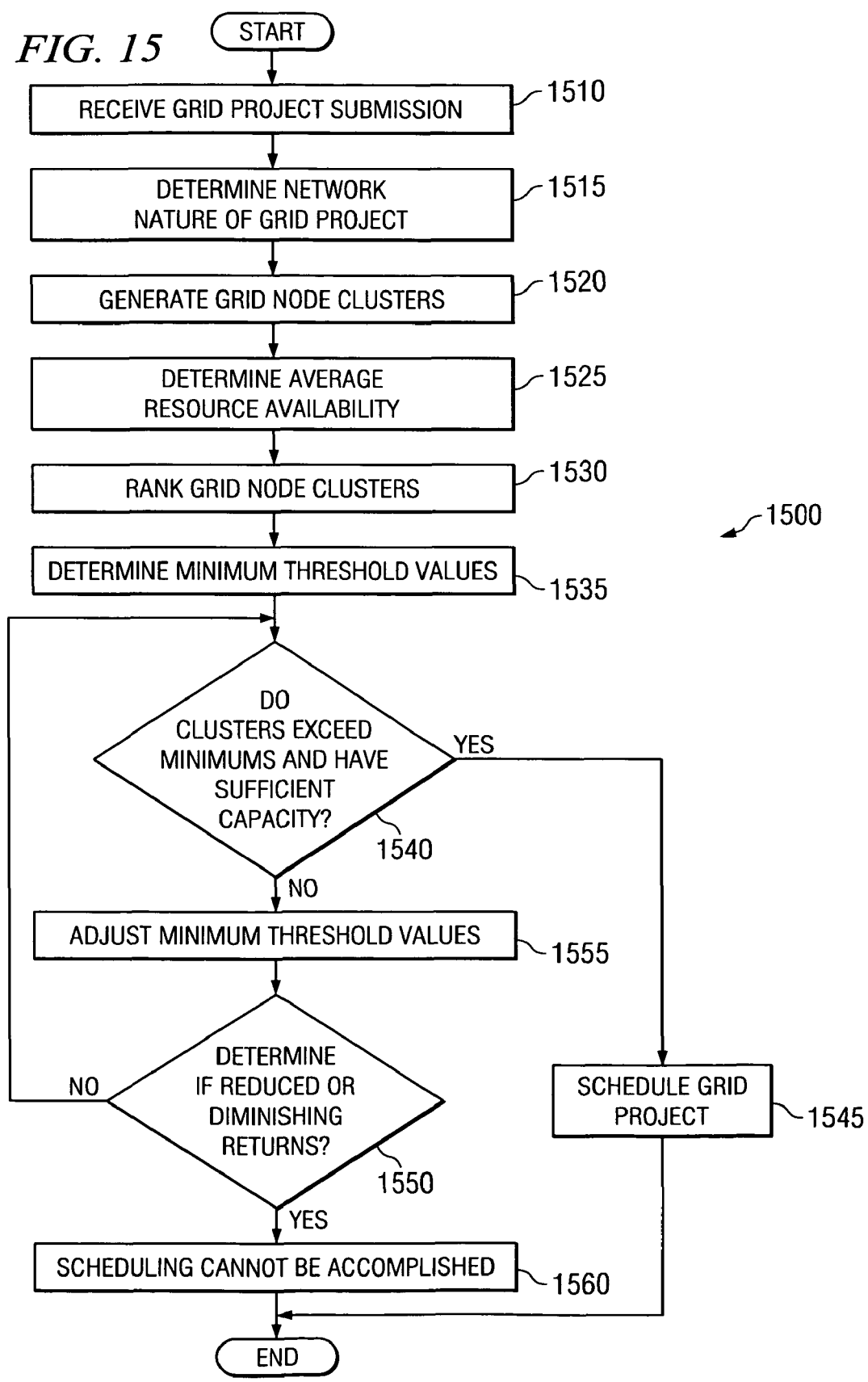

GRID NETWORK THROTTLE AND LOAD COLLECTOR

BACKGROUND OF THE INVENTION

1. Field of the Invention:

The present invention is generally directed to an improved data processing system. In particular, the present invention is directed to an improved grid computing system in which a throttle control is provided to control the rate at which a grid job utilizes processor and network resources.

2. Description of the Related Art:

In the 1990's, computer scientists began exploring the design and development of a computer infrastructure, referred to as the computation grid, whose design was based on the electrical power grids that had been known to date. Grid computing was initially designed for use with large-scale, resource intensive scientific applications, such as the Search for Extraterrestrial Intelligence (SETI) program's computing grid, that require more resources than a small number of computing devices can provide in a single administrative domain. Since then, grid computing has become more prevalent as it has increased in popularity as a mechanism for handling computing tasks.

A computation grid enables computer resources from geographically distributed computing devices to be shared and aggregated in order to solve large-scale resource intensive problems. A computational grid may also be referred to as just a "grid." To build a grid, both low level and high level services are needed. The grid's low level services include security, information, directory, and resource management services. The high level services include tools for application development, resource management, resource scheduling, and the like. Among these services, the resource management and scheduling tends to be the most challenging to perform optimally.

Known grid computing systems, such as Legion, Data Synapse, Platform Computing, Grid MP™ from United Devices, Berkley Open Infrastructure for Network Computing (BOINC), PBS Pro™ Grid from Altair, the Globus® Toolkit (available from Argonne National Laboratory, Chicago, Ill.), and the Open Grid Services Architecture (OGSA), perform resource management and scheduling based primarily upon the processor load(s) of the various nodes, i.e. computing devices, in the computing grid with some other non-dynamic prerequisite factors being taken into account to determine which nodes may be utilized in the computing grid. Thus, if a node meets all of the non-dynamic prerequisite factors and its current processor load is below a predetermined threshold, grid jobs may be scheduled to run on that node. If the node's processor load is above the predetermined threshold, the node is no longer a candidate to run grid jobs until its processor load again falls below the predetermined threshold.

Because known grid computing systems only take into consideration processor load(s) as a dynamic factor for determining scheduling of jobs, and fail to consider network traffic that the grid jobs may create, sub-optimal scheduling often results. As a result, the grid jobs, which are intended to be performed in an unobtrusive manner with regard to the regular functioning of the nodes, may adversely affect the existing loads on the nodes.

Because of this sub-optimal scheduling that results due to using only the processor load(s) as a basis for the scheduling, many scientific and commercial enterprises are reluctant to make use of grid computing because of the possible negative impact it may cause on their existing information technology infrastructures. First, these enterprises are uncertain about how much grid activity may disrupt their existing workload and second, they are hesitant to use the computing grid for mission critical projects because they are unable to quantify the capacity of their grid that is necessary to run the grid jobs associated with the grid project within a required time span.

These problems with existing grid computing systems are rooted in the fact that resource management and scheduling in these grid computing systems do not take into account the necessary amount of network traffic for performing grid jobs or the affect that this traffic may have on existing loads of nodes in the grid. Network traffic may negatively affect both the performance of the existing workloads on the nodes in a grid as well as the performance of the grid jobs themselves.

SUMMARY OF THE INVENTION

The aspects of the present invention provide a method and apparatus for controlling the execution of grid jobs on a grid node. A set of parameters, identifying network activity for a grid job on a grid node, are identified. A rate of data transmission for data generated by processing the grid job at the grid node is controlled based on the rate of data transmission and the set of parameters. If a determination is made that the grid node has an application that supports controlling data transmission based on the set of parameters, the set of parameters are sent to the grid node.

According to the aspects of the present invention, network utilization statistics are collected from a network utilization monitor on the grid node. Network utilization attributable to grid work and non-grid work is determined. An expected network availability threshold may be received by the grid node packaged in a wrapper associated with the grid job or grid job data. The rate of data transmission from the grid node is limited if it is determined that the rate of data transmission exceeds an expected network availability threshold set forth in the set of parameters.

In accordance with the aspects of the present invention, a set of parameters, identifying processor activity for a grid job on a grid node, are also identified. A rate of processor utilization by a grid job at the grid node is controlled based on the rate of processor utilization and the set of parameters.

According to the aspects of the present invention, processor utilization statistics are collected from a processor utilization monitor on the grid node. Processor utilization attributable to grid work and non-grid work is determined. Processor utilization attributable to grid workloads and non-grid workloads may be determined by comparing processor utilization data to identifiers associated with grid jobs being processed by the grid node.

An expected processor availability threshold may be received by the grid node packaged in a wrapper associated with the grid job or grid job data. If a rate of processor utilization exceeds an expected processor availability threshold, the rate of processor utilization is limited.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is an exemplary diagram illustrating a grid management system in accordance with one exemplary embodiment of the present invention;

FIG. 6A is an exemplary diagram of a grid project model created in accordance with the grid project modeling language of one exemplary embodiment of the present invention;

FIG. 6B is an exemplary illustration of a grid project modeling language high level XML code script describing a grid project.

FIG. 14 is a flowchart outlining an exemplary operation of the present invention when generating a visual representation of a simulation of a grid project in accordance with one exemplary embodiment of the present invention;

FIG. 15 is a flowchart outlining an exemplary operation of the present invention when scheduling the dispatching of grid jobs in accordance with one exemplary embodiment of the present invention; and FIG. 16 is a flowchart outlining an exemplary operation of the present invention when throttling the network traffic associated with a grid project in accordance with one exemplary embodiment of the present invention.

DETAILED DESCRIPTION OF THE PREFERRED EMBODIMENT

Figure 1:
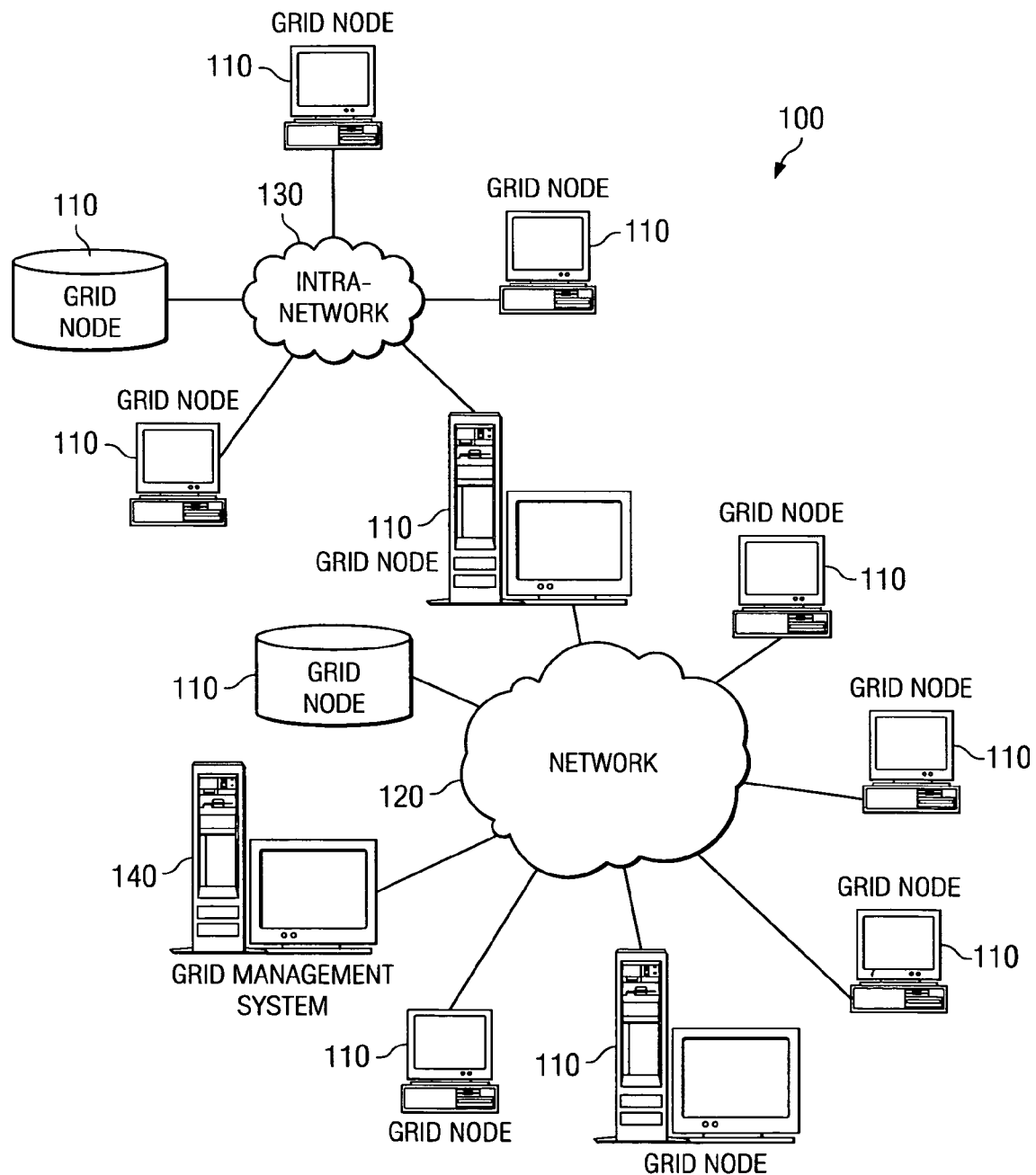
FIG. 1 is an exemplary diagram of a grid computing environment in which aspects of the present invention may be implemented.

FIG. 1 is an exemplary diagram of a computing grid environment in which aspects of the present invention may be implemented. As shown in FIG. 1, the computing grid 100 includes a plurality of grid nodes 110 coupled together via one or more networks 120-130. The grid nodes may be any type of computing device that is capable of either processing grid jobs and grid data provided to it or is capable of providing such grid data to other grid nodes. For example, a grid node 110 may be a server computing device, client computing device, workstation, personal computer, database system, mainframe computer system, or the like.

The computing grid 100 is managed by the grid management system 140. The grid management system 140 communicates with agent software present on the grid nodes 110 to obtain information about each of the grid nodes 110 and to submit grid jobs and grid data to the grid nodes 110 for processing. The grid management system 140 provides the necessary functionality for determining which grid nodes 110 in the computing grid 100 are on-line, which grid nodes 110 have available capacity to handle grid jobs, schedules the dispatching of grid jobs to the various grid nodes 110, receives and correlates the results of the grid jobs dispatched to the grid nodes 110, and performs other grid management functions in accordance with the embodiments of the present invention described hereafter.

A grid project is the highest level of a piece of work on the grid. A grid project may also sometimes be equivalently referred to by the term "grid application." A grid job is a portion of work required to perform a grid project. That is, a grid project is broken up into a plurality of individual grid jobs that may be dispatched to grid nodes for processing. A set of grid jobs performing a grid project may execute in parallel on different nodes in the grid. A grid job may also sometimes be referred to in the art as a transaction, work unit, task or submission.

Each grid node 110 in the computing grid 100 may perform their normal workload, i.e. non-grid related processing, and may also perform processing of grid jobs submitted to them from the grid management system 140. The results of the processing of these grid jobs are then returned to the grid management system 140 or other designated node, which combines the results of various grid jobs in order to obtain the necessary data for completion of the grid project. Grid agent software present on the grid nodes 110 measures performance characteristics of the grid nodes 110 and provides these measurements to the grid management system 140 so that the grid management system 140 can properly schedule dispatching of grid jobs to the various grid nodes 110.

As mentioned above, in known computing grid systems, the available processor capacity of the grid node is the dynamic characteristic of the grid nodes used as a basis for determining the scheduling of grid jobs. That is, the grid management system obtains information from the grid agent software on the grid nodes indicating the CPU utilization of a grid node over time. From this information, the grid management system may determine when the grid node's CPU utilization is likely to be below a predetermined threshold and thus, is able to schedule the dispatching of a grid job to the grid node at that predicted time.

The problem with using only CPU availability as a measure for determining when to dispatch grid jobs is that large amounts of data may be sent on slow links and the grid jobs using that data may not even be executed near the locations where the required data is stored. This results in additional network traffic. Thus, the large amount of data being sent over slow links and the additional network traffic required due to inefficient placement of the data in the grid results in a larger load on the network than would be optimal. This may adversely impact the regular operations of the grid nodes. Thus, instead of an unobtrusive use of the grid nodes, the grid jobs actually negatively affect the regular work performed by these grid nodes.

The aspects of the present invention avoid these negative affects of grid computing by taking into consideration both the processor utilization and network utilization required to perform the functions of a grid project using the computing grid. That is, the present invention utilizes grid agents present on the grid nodes that monitor both processor utilization and availability of the grid nodes, with regard to both grid and non-grid work, and network utilization and availability of the links between grid nodes, to determine availability of the grid nodes to process grid jobs. This information is then used to model grid activity, to simulate the performance of the computing grid with regard to the processing of a grid project, to schedule dispatch of grid jobs to the grid nodes, and to throttle transmission of the grid jobs and their data to the various grid nodes so that adverse impacts on the regular functioning of the grid nodes is avoided.

Figure 2:
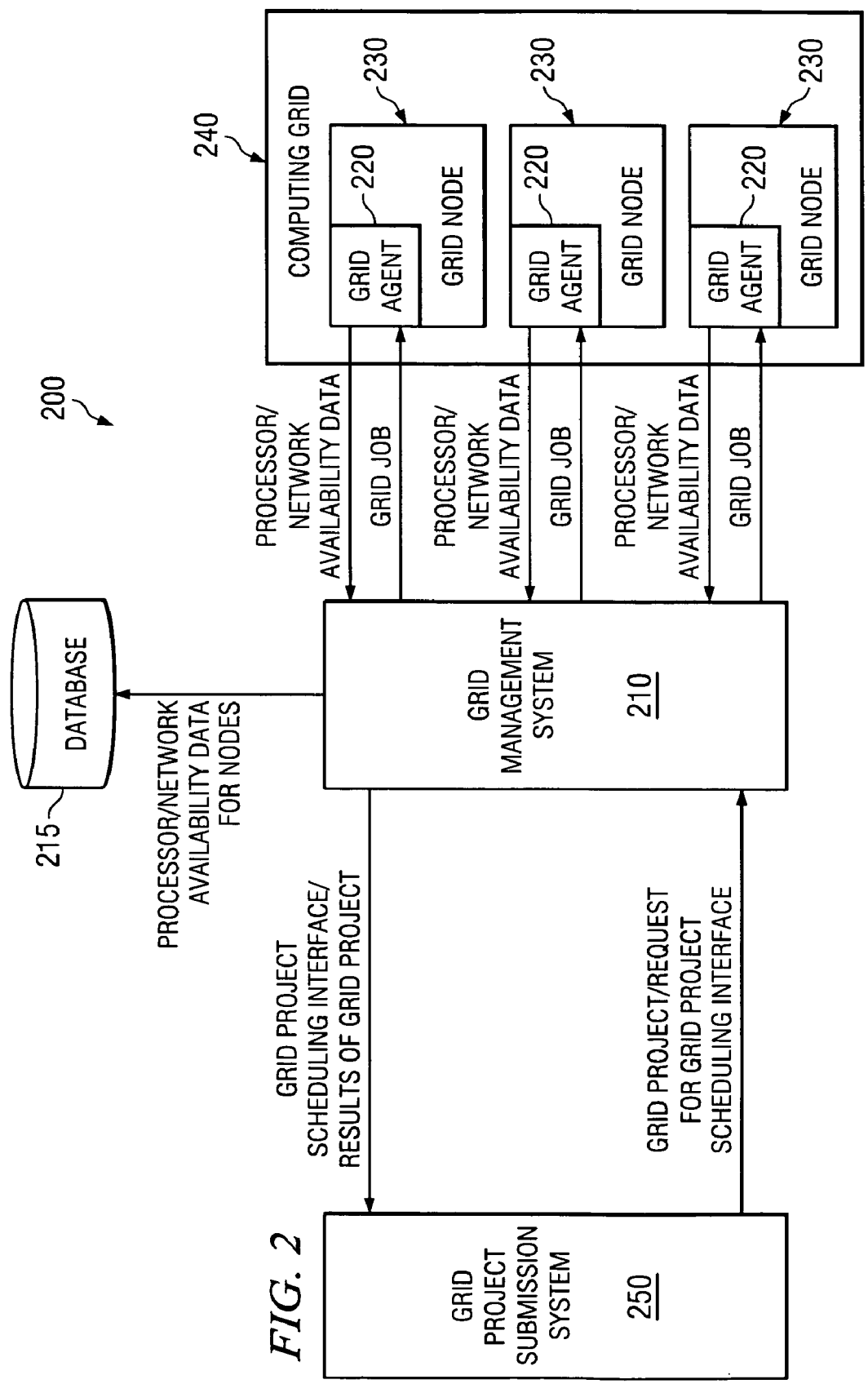
FIG. 2 is an exemplary diagram illustrating the interaction of the grid management system and the grid agents on the various grid nodes.

FIG. 2 is an exemplary diagram illustrating the interaction of the grid management system and the grid agents on the various grid nodes of a grid computing system 200. As shown in FIG. 2, the grid management system 210 communicates with the grid agents 220 on the grid nodes 230 of the computing grid 240 to obtain processor and network availability data. The grid agents 220 include processor utilization monitors and network utilization monitors to obtain measures of processor and network utilization with regard to grid and non-grid job processing. The processor utilization monitors determine, over a period of time, how much of the processor resources of the grid node are being used to process non-grid work, process grid jobs, and how much of the processor resources are idle. The network utilization monitors determine, over a period of time, how much of the network capacity associated with links to this grid node are being used and how much capacity is available.

This processor and network utilization data is transmitted to the grid management system 210 where the data is stored in a database 215 for later use. For example, the grid management system 210 of the present invention uses the information stored in the database 215 in generating a grid project description model, determining a simulation of the grid project processing performance, scheduling grid job dispatching, and throttling of grid job data transmissions.

The grid management system 210 receives grid projects from a grid project submission system 250. The grid project submission system 250 may communicate with the grid management system 210 to submit the grid project, request and view a simulation of the grid project, adjust dispatch parameters for the grid project based on the simulation of the grid project, and receive results of the grid project being processed by the computing grid 240.

When a grid project is submitted by the grid project submission system 250 to the grid management system 210, the grid project may be simulated using the data maintained in the database 215 such that the affect of various start times, various additional grid nodes, and the like, may be determined. From this information, the user of the grid project submission system may select appropriate grid project dispatching criteria for use in dispatching the grid project as a plurality of grid jobs to the grid nodes 230 of the computing grid 240.

The grid management system 210 then schedules the dispatching of the grid jobs based on the selected dispatch criteria. This scheduling of grid jobs may involve selecting certain grid nodes to which the grid jobs should be submitted based on non-dynamic characteristic information about the grid nodes maintained by the grid management system 210. At the schedule time(s), the grid management system 210 transmits grid jobs and/or corresponding data to the grid agents 220 on the appropriate grid nodes 230. The grid agents 220 preferably include grid client software that permits the grid agents 220 to execute the grid jobs on their respective grid nodes 230. The dispatching and execution of grid jobs on grid nodes is generally known in the art. For example, the Globus® or OGSA mechanisms may be used to execute grid jobs on grid nodes using grid client software.

Figure 3:
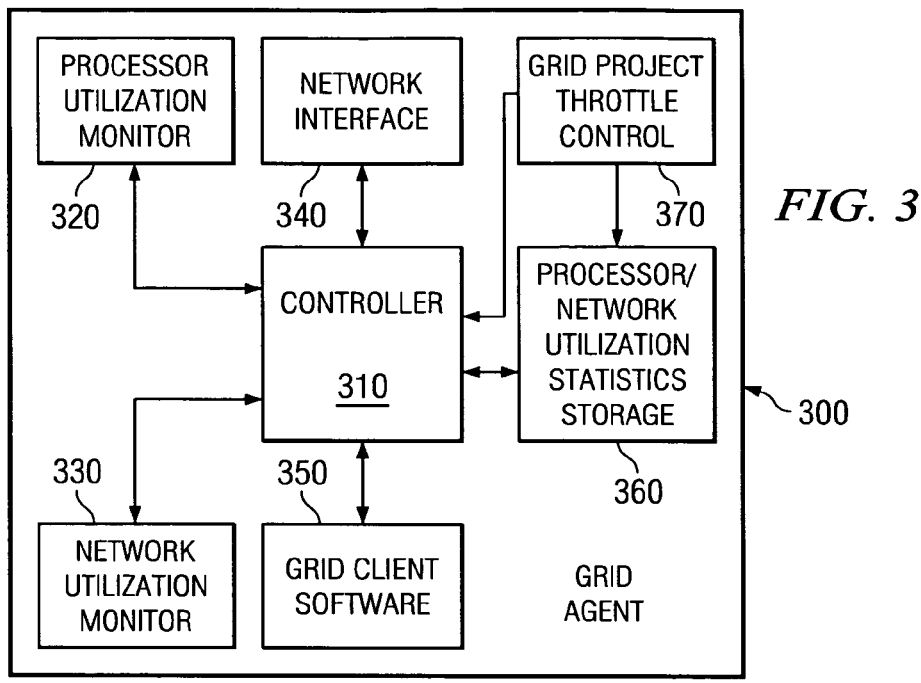
FIG. 3 is an exemplary block diagram of a grid agent in accordance with one exemplary embodiment of the present invention.

FIG. 3 is an exemplary block diagram of a grid agent in accordance with one exemplary embodiment of the present invention. As shown in FIG. 3, the grid agent 300 includes a controller 310, a processor utilization monitor 320, a network utilization monitor 330, a network interface 340, grid client software 350, a processor/network utilization statistics storage 360, and a grid project throttle control 370. The grid agent 300 is implemented as software instructions executed by the processor(s) of the grid node on which the grid agent 300 is deployed. The grid agent 300 executes as a background application that is not readily discernible to a user of the grid node on which the grid agent 300 is running.

The controller 310 controls the overall operation of the grid agent 300 and orchestrates the operation of the elements 320-370. The processor utilization monitor 320 monitors the processor utilization of the grid node with regard to both grid and non-grid workloads. The processor utilization monitor 320 distinguishes between processor utilization associated with grid workloads and processor utilization associated with non-grid workloads. This distinguishing between processor utilization of grid workloads and non-grid workloads is accomplished by tying the monitoring functions of the processor utilization monitor 320 with the grid client software 350.

The grid client software 350 communicates with the grid management system, accepts grid jobs to be performed, executes them under an appropriate environment, and then returns results from the grid jobs. The grid client software 350 for different embodiments of the present invention is augmented to keep track of processes and threads doing work on behalf of the grid. That is, the grid client software 350, as processes are executed and threads are created, maintains a data structure that stores an identifier of the processes or threads that are associated with grid jobs being processed by the grid node. Statistics regarding all threads executed by the processor(s) of the grid node are maintained in another data structure. These statistics may include, for example, amount of processing cycles needed to execute the thread, memory usage, disk space usage, amount of CPU time used to execute the thread, or the like.

By comparing the two data structures, the statistics associated with grid-related threads and non-grid related threads may be differentiated. The non-grid related threads constitute workload on the systems that is not initiated by grid work and thus, represent the normal workload on the system. Thus, a determination may be made as to how much non-grid workload is present on the grid nodes' processor(s) at specific times. As a result, a more accurate measurement of the actual processor capacity of the grid node is determined.

The network utilization monitor 330 is used to generate network utilization statistics for the grid node. Often grid jobs need a large amount of input data which must be transmitted to the grid node performing the work, i.e. processing the grid job. Large amounts of output data may also be produced by grid jobs. In addition, unless grid jobs are scheduled on nodes near databases storing the required data that the grid job may need to access, significant delays can occur due to network traffic and the need to retrieve the required data from a remote database.

All of these situations can take up valuable network bandwidth and can cause severe congestion in the network. As a result, both the grid node's normal workload and the grid jobs themselves may be negatively impacted by the consumption of network bandwidth on links to and from the grid node.

The grid project throttle control 370 throttles processor and network utilization if such utilization exceeds predetermined expected processor and network availability values. This throttling mechanism, discussed more fully below, prevents network congestion and processing delays caused by execution of grid jobs in order to ensure that regular operation of the grid nodes, i.e. the grid nodes usual workloads, are not adversely affected by transmission and processing of grid jobs and grid job data.

To collect the information needed to determine the network utilization of the grid node, the network utilization monitor 330 uses conventional network traffic monitors to determine the amount of traffic between each pair of grid nodes on a physical network link. That is, each grid node of the network includes a conventional network traffic monitor that determines the amount of network traffic over links between that grid node and the grid nodes to which that grid node is linked. The network utilization monitor 330 for the illustrative example of the present invention determines the most probable route that a data packet will travel between that grid node and other grid and non-grid nodes. The network utilization monitor then determines the minimum capacity link in the route. For example, the network utilization monitor 330 may use the trace route utility available in the Windows™ and Unix™ operating systems (i.e., the tracert or traceroute command line program) to determine the likely route that a data packet will traverse between any two grid nodes. The conventional network traffic monitors of both the grid nodes and non-grid nodes along the route may be used to determine the capacity of the links between grid nodes so that a minimum capacity link is set as the maximum capacity available between the two grid nodes.

Figure 4:
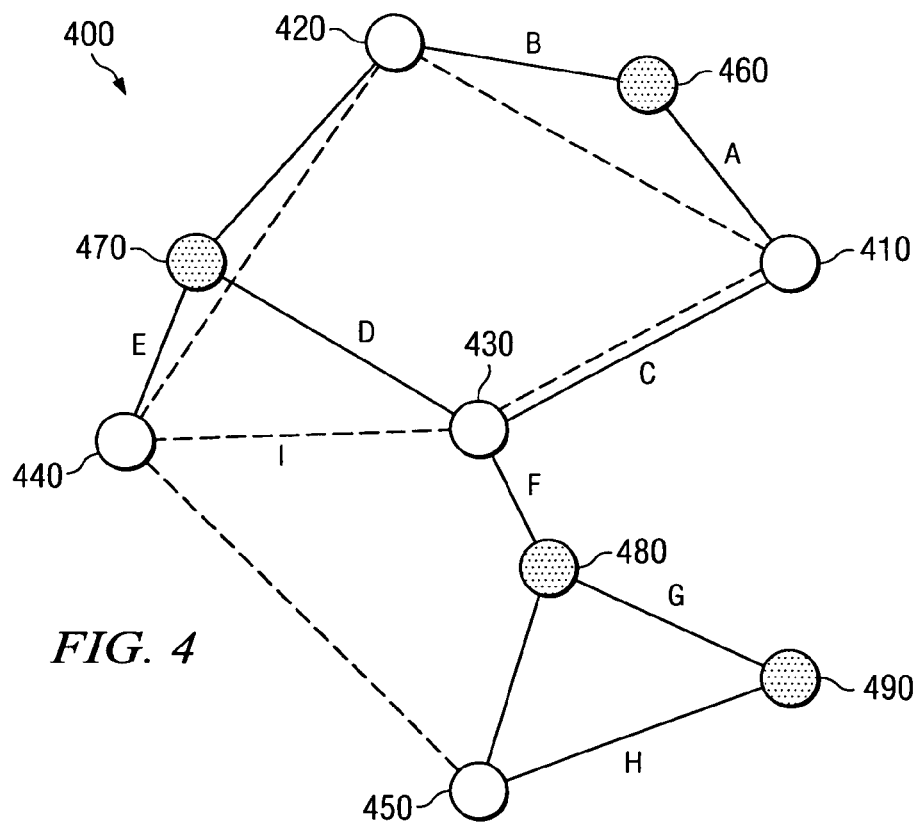
FIG. 4 illustrates an exemplary process for determining the capacity of the links between grid nodes so that a minimum capacity link is set as the maximum capacity available between two grid nodes in accordance with one exemplary embodiment of the present invention.

This process is illustrated in FIG. 4. As shown in FIG. 4, a grid node 410 needs to determine the maximum capacity available between itself and other grid nodes 420-450 of the computing grid 400. Each of grid nodes 410-450 is equipped with a grid agent that includes a conventional network traffic monitor for monitoring the amount of traffic and available bandwidth along connections or links to that grid node. In addition, non-grid nodes 460-490 may also be present in the network that are not part of the computing grid 400. These non-grid nodes may also be equipped with conventional network traffic monitors for monitoring the amount of traffic and available bandwidth along connections to a given grid node.

In determining the maximum capacity available between itself and each of other grid nodes 420-450, grid node 410, in one exemplary embodiment, runs the trace route utility using the destination IP address, Universal Resource Locator (URL), or the like, of the grid nodes 420-450 as the basis upon which to perform the trace route operation. The IP address, URL, or the like, of the grid nodes 410-450 may be maintained in a data structure associated with the grid agent for use in determining network capacity and utilization. As a result of running the trace route utility on grid node 420's IP address, the trace route utility determines that the most probable route for a data packet being sent from the node 410 to the node 420 is the route comprising links A and B. Similarly, the route between node 410 and 430 is determined by the trace route utility to be link C. The route between node 410 and node 440 is comprised of the links C, D and E and the route between node 410 and 450 is comprised of the links C, F, G and H.

The network capacity along links between nodes 410-490 in the network may be determined using the conventional network traffic monitors of the grid nodes 410-450 and non-grid nodes 460-490. The depicted example is a simplified version of a computing grid 400 so that many of the routes between grid node 410 and the other grid nodes comprise a single link (shown in dashed lines). However, in more complex computing grid configurations, it should be appreciated that a single route may involve links between three or more nodes, including both grid nodes and non-grid nodes.

One example of a route involving multiple nodes is the route between grid node 410 and grid node 440. In this example, the route passes through grid node 430. Thus, two measurable links exist: link C between grid node 410 and 430, and link I between grid nodes 430 and 440. The network capacity, or available bandwidth, of each link is determined and the minimum network capacity, or available bandwidth, is selected as the maximum network capacity between grid node 410 and grid node 440 for the particular measurement period. Thus, values can be deduced (approximately) for network capacity available between any two grid nodes.

Returning to FIG. 3, the processor/network utilization statistics storage 360 is used to store both the processor utilization statistics and network capacity or utilization statistics data collected over an "n" minute interval, where the value of "n" depends on the particular implementation of the embodiments of the present invention and may be set to any time period. The intervals may be sent by the grid agent to the grid management system where they may be aggregated with other statistical measurements obtained from that grid node and other grid nodes. The aggregated processor and network utilization information may then be statistically evaluated to determine typical values, such as daily, weekly, monthly, or other repetitive period values of expected processor and network capacity in the computing grid.

Specifically, in one exemplary embodiment, for each collection point, grid node, and time window, a sum of values of the processor and network available capacity, a sum of the squares of these values, and the number of samples taken is stored. This storing of data permits the computation of standard deviation, mean and other statistics over the data collected without needing to keep the entire set of collected data. This data may then be used to simulate the execution of a grid project on the computing grid at various times of the week, month, year, etc., to determine scheduling of the dispatching of grid jobs to grid nodes, throttling of data transmission associated with grid jobs, and the like, as discussed hereafter.

FIG. 5 is an exemplary diagram illustrating a grid management system in accordance with the aspects of the present invention. The grid management system 500 may be implemented in hardware, software, or any combination of hardware and software. In an illustrative embodiment of the present invention, the grid management system 500 is implemented as software instructions executed by one or more data processing devices.

As shown in FIG. 5, grid management system 500 includes controller 510, network interface 520, grid project storage interface 530, grid project storage system 535, grid project visualization and simulation engine 540, node processor/network availability storage system interface 550, node processor/network availability data storage system 555, grid project scheduling engine 560, and grid project job dispatcher 580. These elements are in communication with one another via control/data signal bus 590. Although a bus architecture is shown in FIG. 5, the different aspects of the present invention are not limited to such and any architecture that facilitates the communication of control/data signals between the elements described above may be used without departing from the spirit and scope of the present invention.

Controller 510 controls the overall operation of grid management system 500 and orchestrates the operation of the other elements in this system. Network interface 520 provides a communication pathway for receiving and sending data. In particular, network interface 520 provides a mechanism through which statistical data regarding the processor and network availability of the various grid nodes may be received. Similarly, grid project jobs and data may be transmitted to grid nodes via the network interface 520. Results of these grid project jobs may also be received through network interface 520.

Grid project storage interface 530 provides a communication interface for storing and retrieving grid project data from grid project storage system 535. The grid project data in grid project storage system 535 may include the actual grid project data for generating grid project jobs and the data upon which the grid project jobs operate. Alternatively, the grid projects and the data upon which the grid project jobs operate may be stored in one or more remotely located databases.

Grid project visualization and simulation engine 540 is used to generate simulations of grid projects as well as a graphical user interface through which the user may view the simulations to determine an optimum scheduling of the grid project jobs. Grid project visualization and simulation engine 540 uses the processor and network availability information obtained from the various grid nodes via network interface 520 and stored in node processor/network availability data storage system 555 via node processor/network availability data storage system interface 550 to determine grid processor and network availability at various times, such as various times of the day, week, month, or year. This information is used to determine how various start times of grid projects will affect the completion time of the grid project as well as the affect on the grid processor and network availability utilization, as discussed hereafter.

Grid project scheduling engine 560 is used to schedule the dispatching of grid project jobs to grid nodes. This scheduling of the grid project may be performed, for example, in response to a user selecting a particular start time for the grid project using the graphical user interface provided by grid project visualization and simulation engine 540. Grid project scheduling engine 560 breaks up the grid project and corresponding grid project data into grid jobs and determines a time at which each grid job should be transmitted to its corresponding grid node.

Grid project job dispatcher 580 actually performs the operations of dispatching grid jobs and their corresponding data to the grid nodes via one or more networks. Grid project job dispatcher 580 works in a similar manner to that known in existing computing grid systems with the primary difference being in that the grid jobs and data being transmitted by the grid project job dispatcher 580 are determined in accordance with the operations of grid project scheduling engine 560, and grid project visualization and simulation engine 540.

When a user wishes to determine the best possible scheduling for a grid project, the user logs onto the grid management system 500 and requests that a particular grid project's execution over a particular time period be simulated. For example, when the user logs onto the grid management system 500 and selects a "grid project simulation" option presented through a graphical user interface (GUI) provided by the grid management system 500, the user is then presented with another GUI through which the user may select or enter a grid project identifier, a time window for the simulation, for example, a start date/time and end date/time, and a statistical basis for the simulation, such as, average processor or network availability per day, average per week, average per month, one standard deviation processor/network availability per day, one standard deviation per week, etc.

The grid project visualization and simulation engine 540 then retrieves node processor/network availability data from the node processor/network availability data storage system 555 for a period of time corresponding to the particular time window selected. For example, if the user selects a time window from Feb. 1, 2004 to Feb. 29, 2004, node processor/network availability data for the period of time corresponding to this time window is retrieved from the storage system 555. For example, the data representing node processor/network availability for each day of the week may be retrieved and repeated for each week between the Feb. 1, 2004 to Feb. 29, 2004 time period to thereby simulate the processor/network availability for the computing grid during the designated time period.

This node processor/network availability data that is retrieved from the node processor/network availability data storage system 555 represents the total availability of the processors and network link resources in the computing grid during the selected time period. This information may be used to generate curves in a plot representing the available resources of the computing grid over the selected period of time. These curves are used along with information about the manner by which the selected grid project is to be dispatched to determine a simulation of the performance of the grid project. The information about the manner by which the selected grid project is to be dispatched is obtained from a model of the grid project obtained from the grid project storage system 535.

Grid project description model provides a description of the various phases of a grid project. The phases of a grid project include, for example, dispatching, execution, and then return of the results data. The various phases of a grid project are described by the description model as a set of descriptions, that include, for example, the number of grid jobs to be dispatched, the amount of data corresponding to each grid job, the amount of run-time for executing the grid jobs on the data, and the estimated amount of data corresponding to the results of the execution of the grid jobs. The descriptions of the various phases also include descriptions of activities to be performed in parallel and serially.

The grid project description model is generated using a grid project modeling language designed to describe the various phases of the grid project. The description model may be generated by a user or provider of a grid project, in accordance with the project modeling language.

The grid project modeling language uses an XML format to define a sequence of phases for a grid project. FIG. 6B is an illustrative example of the grid project modeling language high level XML code script describing a grid project.

The grid project modeling language identifies the various phases of a grid project. The modeling language sets forth a sequence of grid project phases. Within each phase, there may be any number of descriptions of parallel activities to be performed, including CPU processing, network activity, or nested sub-phases. Each of the descriptions specifies the properties of the described activities, such as processing requirements, expected network traffic, prerequisites, dependencies, activity splitting limits and characteristics, reliability action, and others.

FIG. 6A depicts a diagram of a grid project model created in accordance with the grid project modeling language of one exemplary embodiment of the present invention. The grid project model 600 at block 610 illustrates the transfer of grid jobs and/or grid project data to one or more grid nodes via one or more transfer files during the dispatching phase. Blocks 630-645 depict grid nodes processing grid jobs and/or grid data in parallel during the execution phase. Although this illustrative example depicts a single split of grid job 620 into four grid jobs 630-645 processing in parallel, there may be any number of parallel activities performed by any number of grid nodes during this phase. In addition, splits into parallel activities may occur multiple times during the execution phase. At block 650, additional processing of the output from grid jobs 630-645 may occur at grid job 650. Upon completion of processing, the output from grid jobs 620-650 are transferred in parallel at blocks 660-670 back to the grid management system.

The grid project model is parseable by the illustrative examples of the present invention to determine the various phases of a grid project and the various characteristics of each phase. A determination of the amount of processor and network resource requirements for execution of the various phases of the grid project may be made by processing the grid project description model. The necessary processor and network resources are then used with the processor and network availability information for the selected time period to determine how long it will take for each phase of the grid project to be performed.

For example, the required usage of processor and network capacity in order to perform the phases of the grid project are represented as areas bounded by the processor and network availability curves generated based on the grid resource availability information obtained from the grid nodes. Because these areas are bounded by the resource availability curves, if there is less availability of a resource than is necessary to perform a particular portion of a phase of the grid project, more time will be required to achieve the required area. This may be done for each phase of the grid project so that a complete illustration of the execution of a grid project in relation to the resource availability of the computing grid is viewable to a user.

Figure 7:
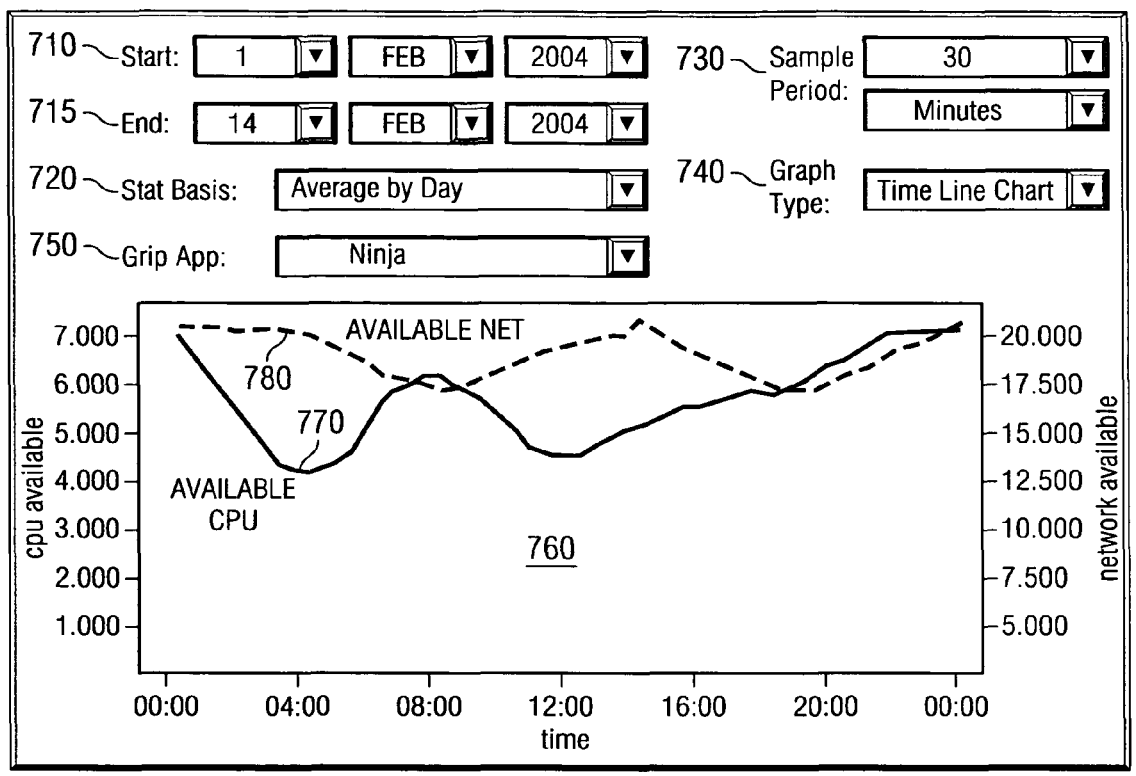
FIG. 7 is an exemplary diagram illustrating a graphical user interface in which resource availability curves for the computing grid may be depicted in accordance with an exemplary embodiment of the present invention.

FIG. 7 is an exemplary diagram illustrating a graphical user interface in which resource availability curves for the computing grid may be depicted in accordance with an exemplary embodiment of the present invention. As shown in FIG. 7, the graphical user interface (GUI) 700 includes fields 710 and 715 for entering a start time/date and end time/date for the simulation. Field 720 is provided for selecting a statistical basis for the simulation representation and field 730 is used to designate a granularity for the plot of the simulation of the grid project. Field 740 is used to select a graphical presentation type, such as, time line chart or other type of graphical representation. Field 750 provides a field through which a particular grid project may be selected for simulation and portion 760 provides a plot of the resource availability curves determined from the node processor/network availability data retrieved according to the selected time window, i.e. start time and end time.

As shown in FIG. 7, the portion 760 includes two line graphs—one line graph element 770 illustrating processor availability over a recurring period of time within the time window, and other line graph element 780 illustrating network availability over the recurring period of time. It should be appreciated that the granularity of the time period illustrated in the portion 760 may be of various levels. For example, rather than a reoccurring period of time within the time window, the entire time window may be illustrated in portion 760 or any subportion thereof. In addition, the period of time illustrated may be changed or scrolled by the user.

The line graphs 770 and 780 represent the upper boundary of processor and network resources that may be utilized by the grid project. The line graphs 770 and 780 may represent the actual processor and network availability, averages of processor and network resource availability, one standard deviation from the actual or average processor and network resource availability, or the like. These line graphs 770 and 780 provide the basis upon which to determine how much time is required to complete each phase of the grid project.

Figure 8:
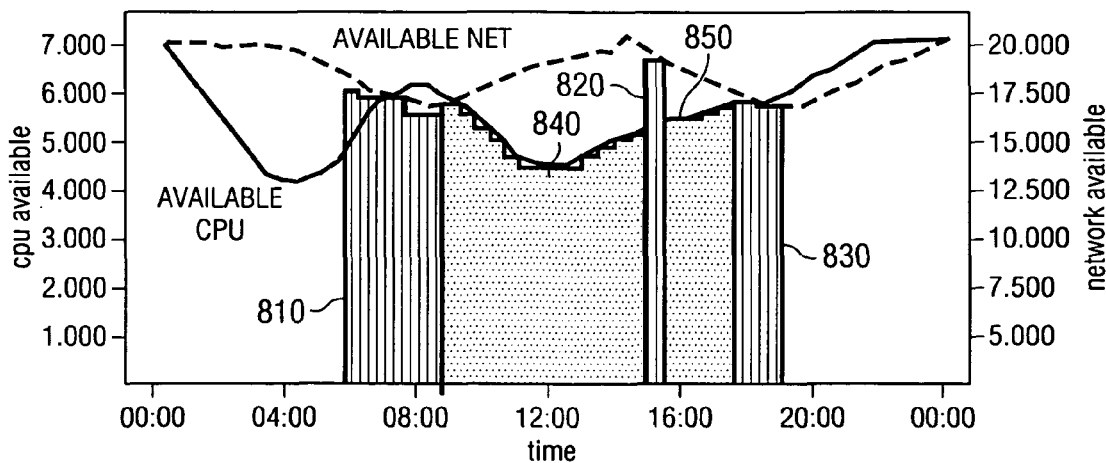
FIG. 8 is an exemplary diagram illustrating one mechanism for depicting the execution of a grid project using the resource availability plots of one exemplary embodiment of the present invention.

FIG. 8 is an exemplary diagram illustrating one mechanism for depicting the execution of a grid project using the resource availability plots of one exemplary embodiment of the present invention. As shown in FIG. 8, in one exemplary embodiment of the present invention, each phase of the grid project is depicted as areas under the grid lines representing the computing grid resource availability. The phases of the grid project involve phases in which processor resources are dominant and phases of the grid project in which network resources are dominant.

These phases are depicted in FIG. 8 in different shadings of the areas below the processor and network resource availability. Lightly shaded areas 810, 820 and 830 represent phases of the grid project in which network availability is a dominant factor in determining the performance of the grid project. Darker shaded areas 840 and 850 represent portions of the grid project where processor availability is a dominant factor. It should be appreciated, however, that rather than differentiating between phases based on dominant resources, the aspects of the present invention may operate on phases of the grid project in which both resources are considered equally important to the determination of grid project performance.

As shown in FIG. 8, the grid project is comprised of a phase of execution, represented by area 810, in which the grid project transfers grid jobs and grid project data to the grid nodes. A second phase of operation, represented by area 840, is a representation of the grid nodes processing the grid jobs and data transmitted to them. A third phase of operation, represented by area 820, is a representation of a transmission of some additional data for processing by the grid nodes. A fourth phase of the grid project, represented by the area 850, is a representation of the grid nodes performing some additional processing. The fifth phase of the grid project, represented by the area 830, represents the grid nodes transmitting data back to the grid management system, such as, results of the execution of the grid project.

The phases of the grid project 810, 820 and 830 that are dominated by network resource availability are primarily bounded by the line graph representing the network resource availability. As shown in FIG. 8, there are portions of the areas 810, 820 and 830 that exceed the processor availability line graph yet are below the network availability line graph. Similarly, there is a portion of the area 840 where the area 840 exceeds the network availability line graph yet is below the processor availability line graph.

The depiction of the areas under the resource availability line graph is made based on a selected start point, the phases of the grid project defined by the grid project model, and the resource availability data obtained from the grid nodes and maintained in the node processor/network availability data storage system. The user may modify the start time by moving a cursor over the depiction 800 or otherwise entering a different start time. The grid management system modifies the depiction 800 of the grid project performance based on the change in the start time. In this way, the user may see the affect of different start times on the performance of the grid project.

For example, if the user selects an earlier start time, this results in a different amount of processor and network resources being available to perform the various phases of the grid project. If this different amount of processor and network resources results in a lower amount of resources being available for a particular phase, then the time period for completing this phase of the grid project may be increased. Similarly, if the different amount of processor and network resources results in a higher amount of resources being available, the time period for performing this phase of the grid project may be shortened.

As shown in FIG. 8, phases dominated by processor resources and phases dominated by network resources are depicted simultaneously in the graphical depiction of the simulation of the grid project performance. Thus, both the affects of available network resources and available processor resources on the performance of the grid project are illustrated in the graphical depiction of the grid project's performance. As the start time of the grid project changes, the size of areas 810-850 are kept consistent even though the dimensions, i.e. time versus amount of resource, may be modified based on the amount of available processor and network resources.

Figure 9:
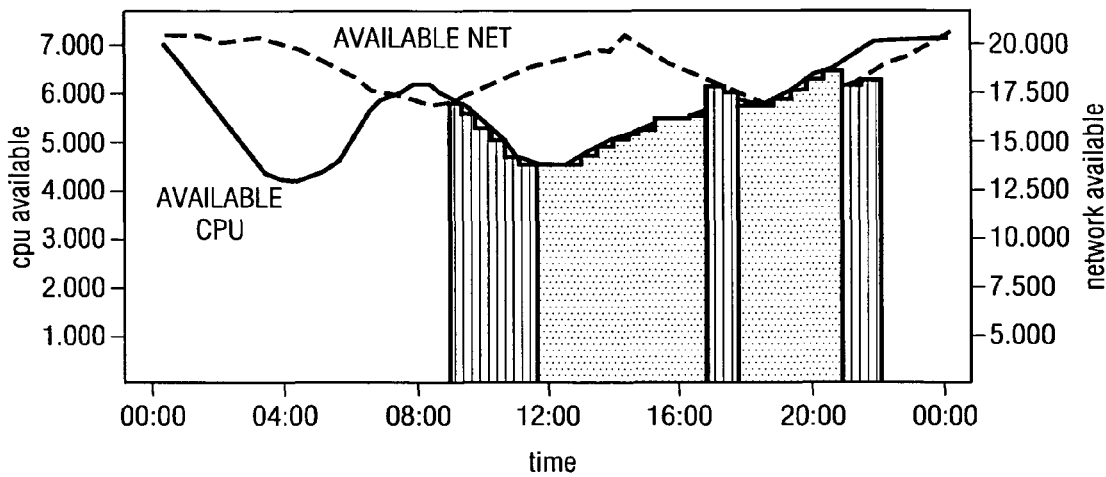
FIG. 9 is an exemplary diagram illustrating a graphical depiction of the same grid project as shown in FIG. 8 in which the start time for performing the grid project has been changed.

FIG. 9 is an exemplary diagram illustrating a graphical depiction of the same grid project as shown in FIG. 8 in which the start time for performing the grid project has been changed. As shown in FIG. 9, in response to the start time being changed, an end time of the grid project has also changed. This is because, while the amount of processor and network resources needed to complete the grid project has not changed, the availability of the processor and network resources has changed due to the change in the start time of the grid project. Thus, by altering the start time for a grid project to begin, the end time for the completion of the grid project change as a result. This may be important with regard to deadlines for completing grid projects.

Thus, the aspects of the present invention provide a graphical user interface through which a depiction of the grid project's. performance 900 with regard to both the available processor and network resources is provided. The graphical user interface permits the user to modify the start times of the grid project with the depiction 900 of the grid project being modified dynamically as the start times are changed. In this way, a user may determine whether the grid project will be completed within a necessary time period taking into account the processor and network resource availability.

While the above illustrative examples have been described in terms of the processor and network resource availability data obtained from grid nodes, in a further example of the present invention, the affect of adding additional grid nodes on the performance of a grid project may be determined using the graphical user interface. Similar to changing the time at which the grid project is started, the introduction of additional grid nodes into the computing grid changes the amount of processor and network resources. The aspects of the present invention may modify the upper bounds of the available processor and network resources based on the additional resources provided by the addition of grid nodes from other sources than are typically available in the computing grid. The affect of these additional resources on the performance of the grid project may then be depicted in a similar manner as that described above.

For example, a user may determine that the processor and network resource availability from the established computing grid is not sufficient to perform the grid project in a manner to achieve the purposes and deadlines of the user. The provider of the computing grid may have entered into an agreement with other computing system providers to provide conditional computing system and/or network resources when necessary. Many such agreements may be present for different groups of processor and/or network resources. The inclusion of each of these groups and the resulting affect on the performance of a grid project may be determined using the graphical user interface.

The user of the graphical user interface may be provided with a mechanism in the graphical user interface to select viewing of a simulation of the grid project with an extended grid. In addition, the extent of the extension of the grid may be selectable. As a result, resource availability data for these additional grid nodes, which is obtained in a similar manner as described above with regard to the basic grid nodes, may be retrieved from the node processor/network availability data storage system and used to modify the processor and network resource availability line plots that define the upper bound on the phase areas of the grid project. Since additional resources are made available by incorporating additional grid nodes, the result of including these additional grid nodes tends to shorten the amount of time necessary to complete the performance of the grid project.

Figure 10:
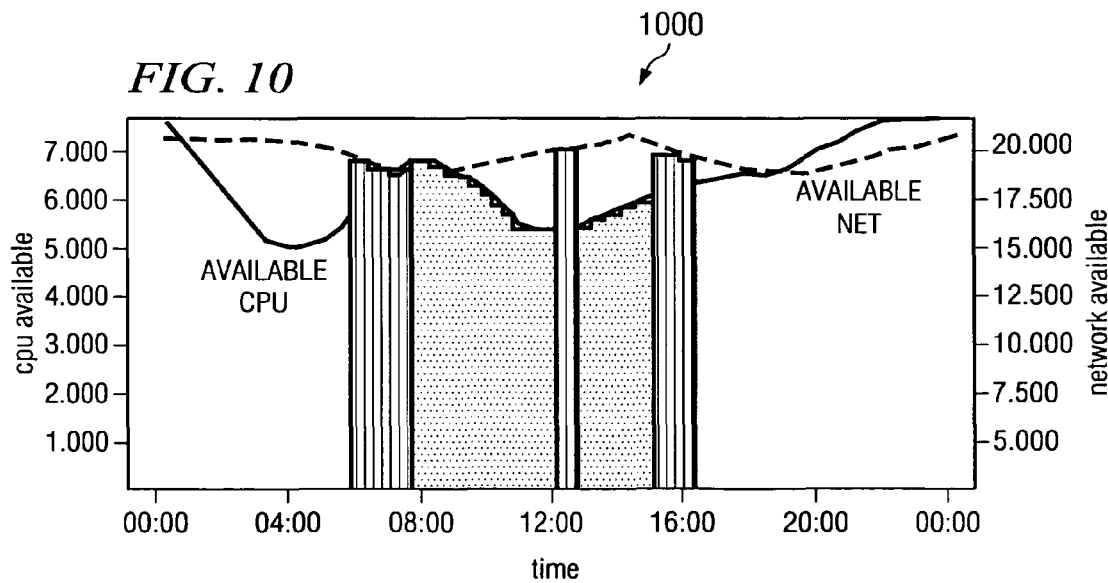
FIG. 10 is an exemplary diagram illustrating the affect of an extended grid on the grid project of FIGS. 8 and 9 in accordance with on exemplary embodiment of the present invention.

This result is illustrated in FIG. 10 in which an extended grid's affect on the grid project of FIGS. 8 and 9 is depicted. As shown in FIG. 10, the inclusion of additional processor and network resources causes the line plots to represent larger amounts of resources being available. As a result, the time period from the start time to the completion of the grid project is made shorter. As with the previous embodiments of the present invention, the user may again modify the start time of the grid project and see the affect on the performance of the grid project within the selected extended computing grid on the depiction 1000 of the grid project's performance.

Once the simulation of the grid project has been presented and the user has determined an appropriate start time for the grid project, as well as whether an extended grid should be used, the grid management system schedules the dispatching of the grid project jobs to particular grid nodes. Part of this process is generating grid project jobs based on the grid project model and selecting grid nodes to which the grid project jobs and data are to be transmitted. The generation of grid project jobs based on a grid project is generally known in the art and thus, a detailed description is not provided herein.

In selecting grid nodes to which grid jobs are to be dispatched, the network nature of the grid project is first determined. For example, the grid project scheduling engine determines if the grid project is one of:

a hub and spoke type of grid project in which quantities of data are sent to and from the grid jobs being executed on the grid agents of the grid nodes from a submission point with minimal other communications during job processing;

a grid project in which grid jobs primarily access data from a database located at a specific location on the computing grid; and a grid project in which grid jobs communicate extensively with each other during their processing.

Based on the determination of the nature of the grid project, a clustering algorithm is then used to map sets of grid nodes based on how well they are connected to the submission point, a database at the designated location, or based on the grid nodes' mutual interconnectivity. Clustering algorithms are generally known in the art and thus, a detailed description of the clustering algorithms is not provided herein. The basis for the clustering algorithm is determined based on the type of grid project determined above. The resulting clusters are then ranked in accordance with processor capacity and network capacity, having already subtracted processor and network capacity consumed by other non-grid or grid work.

For example, a first table of grid node clusters is generated ranked by processor capacity. A second table of grid node clusters is generated ranked by network capacity. These two tables are then used to generate a two-dimensional plot of the clusters based on both processor and network capacity. Initial minimum requirements of processor and network resources for selection of clusters of nodes to execute the grid jobs are then established. A determination is then made as to whether the clusters of grid nodes that are above both minimum requirements have sufficient capacity to perform the work required of the grid project. If not, the initial minimum processor and network capacity is adjusted so that more clusters are evaluated.

This process may be repeated until the clusters above the minimum requirements provide sufficient capacity to execute the grid project or until successive recalculations show diminishing or even reduced returns when using more clusters. If a set of clusters is identified that would meet the capacity requirements for executing the grid project within the timeline indicated by the simulation of the grid project, or an otherwise set timeline, then the set of clusters is used to schedule the performance of the grid project. If there is evidence of diminishing or even reduced returns when recalculating the minimum processor and network capacities and evaluating the additional clusters, then an indication that a suitable scheduling cannot be accomplished may be returned to the user.

Figure 11:
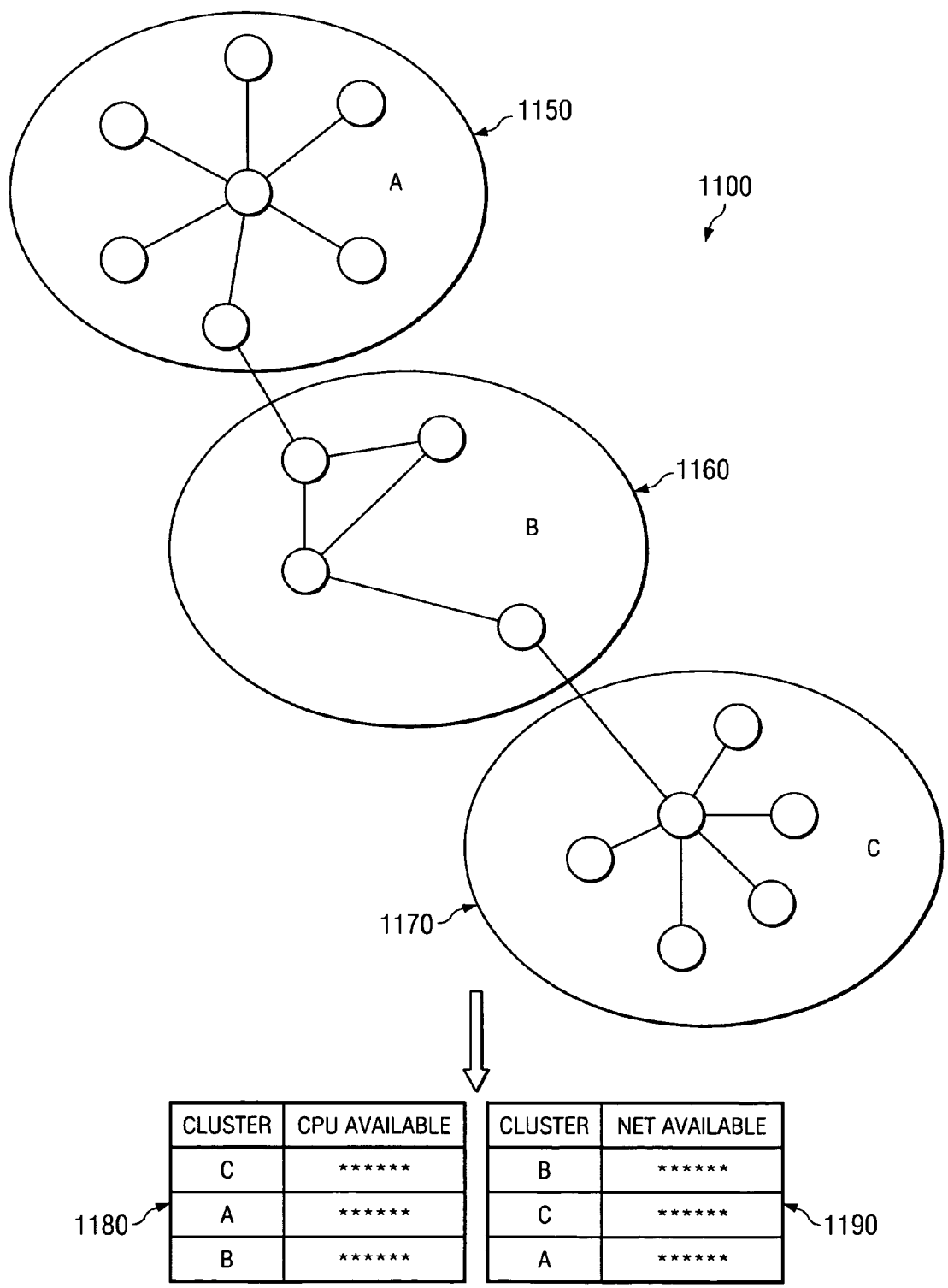
FIG. 11 illustrates a clustering of grid nodes in accordance with one exemplary embodiment of the present invention.

FIG. 11 illustrates a clustering of grid nodes in accordance with one exemplary embodiment of the present invention. As shown in depiction 1100, grid nodes are clustered in accordance with their network proximity to each other, to a source of grid jobs, or to databases from which data is accessed for performing the grid jobs. Network clustering algorithms are generally known in the art and the embodiments of the present invention may make use of any known network clustering algorithm for determining clusters of grid nodes.

Based on the particular clustering algorithm used, various clusters, such as clusters 1150-1170, may be generated. An average processor and network capacity for each cluster over the time period for performing the grid project, as selected using the graphical user interface and simulation mechanism of the embodiments of the present invention, for example, is determined for each cluster. That is, for example, the total processor and network capacity for each grid node in the cluster is summed and the sums of the time period of interest are averaged in order to determine the average resource availability of the cluster.

The averages of the processor and network resource availability or capacity are then used to rank the clusters in corresponding tables 1180 and 1190. Table 1180 is a table of the identified clusters ranked by average processor capacity. Table 1190 is a table of the identified clusters ranked by average network capacity. These tables are used to plot the clusters in a two dimensional graph of processor capacity versus network capacity.

Figure 12:
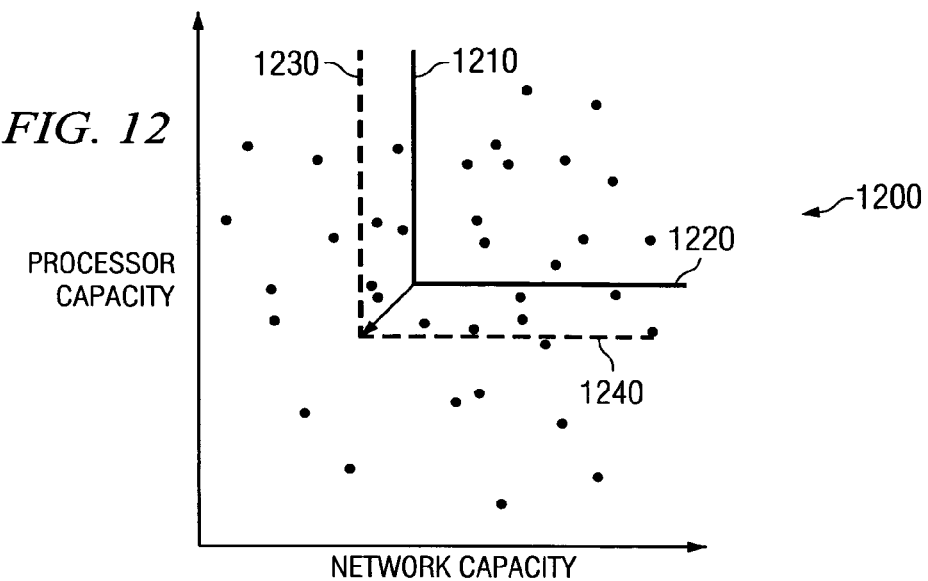
FIG. 12 is an exemplary two dimensional plot of grid node clusters based on processor and network resource availability or capacity.

FIG. 12 is an exemplary two dimensional plot of grid node clusters based on processor and network resource availability or capacity. As shown in plot 1200, in this exemplary embodiment, the x-axis is network capacity and the y-axis is processor capacity. The clusters are then plotted on this graph based on their determined average processor and network capacities.

A minimum threshold for processor and network capacities is then determined. These minimums are selected by the user or by a specification in the scheduled grid project. The minimums are represented as lines 1210 and 1220. A determination is then made as to whether the clusters that are plotted in the upper right of the graph, such as above the minimum lines 1210 and 1220, have sufficient total processor and network capacity to accomplish the execution of the grid project within the time period established by the simulation of the grid project, or the time period otherwise specified by the user. If so, then the clusters identified in the upper right of the graph are selected as the clusters to which grid jobs are to be dispatched and the scheduling of these grid jobs being processed by the selected clusters is performed.

If, however, the total capacity of the clusters in the upper right of the graph is not sufficient to complete the grid project within the time period requested, then the minimum processor and network resource capacity lines 1210 and 1220 are recalculated and a larger set of clusters is evaluated. As a result, new minimum capacity lines 1230 and 1240 are generated and the clusters above and to the right of these lines are evaluated to determine if their total resource capacities are such that the grid project will be completed within the selected time period. This process may be repeated until a sufficiently large size of clusters with sufficient resource capacity is identified or until additional recalculations result in diminished or reduced returns.

Once a set of clusters are identified, the grid project scheduling engine generates grid jobs for each of the grid nodes in the clusters and schedules the dispatching of these grid jobs to the grid nodes such that the execution of the grid project within the selected time period may be accomplished. The actual dispatching of the grid jobs to the grid nodes is performed in a known manner using a grid project job dispatcher which transmits the grid job, and optionally the data upon which the grid job is to operate, to the grid nodes at a scheduled time.

As mentioned above, recalculation of the minimum processor and network resource capacity lines possibly may result in diminishing or reduced returns. In such cases, an option may be provided to extend the computing grid in a similar manner as discussed above with regard to the simulation of the grid project. That is, additional grid nodes may be introduced into the basic computing grid in accordance with established relationships with potential grid node providers.

When a determination is made that a suitable scheduling of the grid project cannot be accomplished, the user may be provided with an option to consider the impact of extending the computing grid on the ability to schedule the grid project. If the user elects to extend the computing grid, the user may be prompted to indicate which additional grid nodes are to be added to the computing grid. That is, if a plurality of possible sources of additional grid nodes are present, then the user may select the source or sources from which these additional grid nodes are obtained.

Once the user elects to extend the computing grid and selects the source or sources from which the additional grid nodes are obtained, the clustering and plotting may be performed again. As a result, additional clusters of grid nodes are generated with additional processor and network resources. The same processes as discussed above with regard to determining a set of clusters that permit the grid project to be executed within the selected time period is performed. If the discovery of the set of clusters results in a set of clusters being determined that permit the grid project to be completed within the selected time period, then these grid nodes are used to schedule the dispatching of grid jobs. This scheduling may involve coordinating with the additional grid node source computing system to request access to the additional grid nodes for performing processing on the grid jobs. Thus, a dynamic extension of the computing grid is made possible in order to schedule the dispatching of grid jobs so that a grid project may be completed within the time period determined through simulation of the grid project.

Thus, the aspects of the present invention provide a mechanism by which a user may obtain a simulation of the performance of a grid project based on measured processor and network resource availability/capacity of grid nodes over a selected period of time. The user may see the affect of changing the start time of a grid project on the way in which the grid project will be executed in the computing grid and, more importantly, the affect on the completion time/date of the grid project. This permits the user to determine the optimal time to initiate the grid project on the computing grid so that performance goals are achieved.

In addition, the aspects of the present invention provide a mechanism for scheduling the dispatching of grid jobs on the computing grid, whether using the simulation mechanism as a basis for this scheduling or not. The scheduling mechanism permits the selection of an optimal set of clusters of grid nodes to which grid jobs are to be dispatched in order to complete the grid project within a time period selected by a user. The scheduling mechanism may iteratively expand the set of clusters considered when it is determined that a current set of clusters will not have sufficient processor and/or network availability or capacity to complete the grid project within the designated time deadline.

Both with the simulation mechanism and with the scheduling mechanism, the embodiments of the present invention provide a mechanism for expanding the basic computing grid by including additional grid nodes through arrangements made with potential grid node suppliers or sources. The additional grid nodes may be mapped into the computing grid and the affect of the additional grid nodes on the simulated behavior of the grid project and/or the clustering and resource availability of the clusters of grid nodes may be determined. In this manner, a determination may be made as to whether expanding the computing grid will result in the grid project being completed within a desired time period and if so, expansion of the computing grid may be requested from the additional grid node supplier/source.

In addition to the above, the aspects of the present invention further provide a grid project throttle control for controlling the execution of grid jobs on a grid node. The throttling mechanism operates so that a predetermined limit on the amount of network traffic associated with grid jobs is maintained. That is, with the simulation mechanism as described above, a maximum data transfer amount is determined based on the available capacity of the network as determined from the node processor/network availability data. This maximum data transfer, or network traffic, for the grid jobs may then be reported by the grid project throttle control to the grid agents associated with grid nodes so that they may regulate the amount of grid data processed by their network interfaces. Thus, the grid management system dispatches grid jobs and data to the grid nodes in accordance with this throttling mechanism. The grid nodes also transfer data between grid nodes, as well as the grid management system in accordance with the throttling mechanism. In this way, the grid project is kept from overwhelming the network and is slowed down to a rate that has been calculated to be reasonably unobtrusive to the normal operation of the grid nodes.

The throttle control operates by identifying a set of parameters identifying network activity for a grid job on a grid node. The set of parameters includes one or more parameters identifying network activity. For example, the set of parameters could set for a rate of expected network availability and/or a rate of expected processor availability for a grid job. If the grid node has an application that supports controlling data transmission based on the set of parameters, the set of parameters can be sent to the application on the grid node. The rate of data transmission from the grid node may then be controlled based on the rate of data transmission from the grid node and the set of parameters. The rate of data transmission can thereby be limited by the throttling mechanism if the rate of data transmission exceeds the expected network availability.

Figure 13:
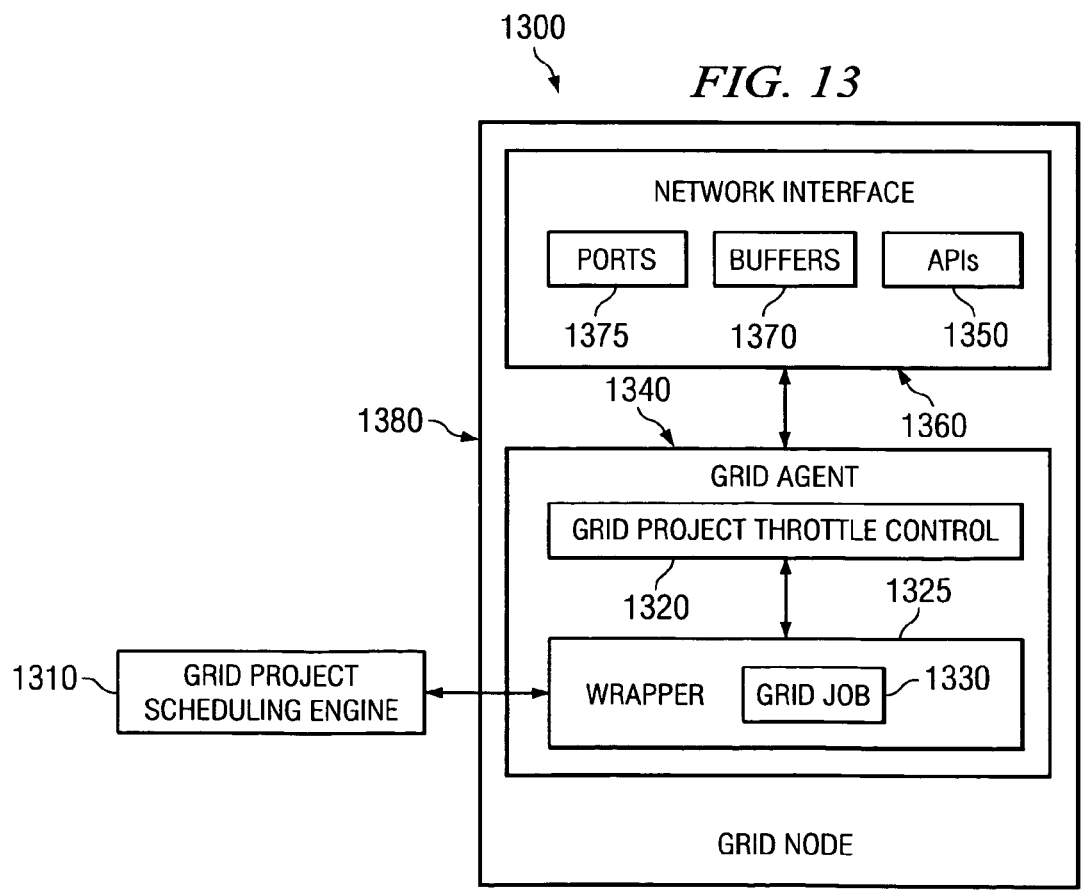
FIG. 13 illustrates the operation of the throttling mechanism in accordance with one exemplary embodiment of the present invention.

FIG. 13 illustrates the operation of the grid project throttle control in accordance with one exemplary embodiment of the present invention. As shown at 1300, the grid project scheduling engine 1310 provides resource requirements information, including expected network and processor availability information, to the grid project throttle control 1320, indicating the amount of network resources, such as, for example, an amount of bandwidth that will be required by each grid job during each phase of the grid project's execution. This information is then packaged into a wrapper 1325 associated with the grid job 1330 and/or grid job data and is provided by the scheduling engine 1310 to the grid agent 1340 in association with the grid job and/or grid job data. The network interface's Application Program Interfaces (APIs) 1350 of the network interface 1360 strips off the wrapper 1325 and processes the expected availability information which is then used to control the rate at which grid data is sent from the grid node 1380 across the network.

That is, the network interface 1360 processes the information indicating the expected network availability. The network resources that grid node 1380 may utilize during its phases of operation, indicated by the expected network availability threshold, in which grid data is transmitted by the grid node 1380 to other computing devices. The expected network availability information places a limit on the rate at which data from the grid agent may be transmitted by the network interface 1360. As a result, the network interface 1360 may limit the rate at which grid data is retrieved from buffers 1370 associated with ports 1375 corresponding to the grid agent 1340, and transmitted over the network.

In this manner, the transmission of data by a grid node is controlled by a network interface 1360 of the grid node in conjunction with throttling information received from the grid project throttle control 1320.

The grid project throttle control 1320 operates to initiate throttling of network utilization for grid jobs when a determination is made that the rate of data transmission attributable to grid work exceeds the expected network availability threshold for data transmission at the grid node, such that data transmission does not exceed the expected network availability. In this way, the grid throttle control 1320 controls the rate at which grid traffic is sent from the grid node 1380 so that the grid traffic does not negatively affect the normal operation of the grid node 1380.

The grid project throttle control 1320 also operates to throttle control of processing of grid jobs by the grid node. The grid node processing resources that the grid node may utilize to process grid jobs are indicated by an expected processor availability threshold. A determination is made as to whether the rate of processor utilization attributable to grid work at the grid node exceeds an expected processor utilization availability threshold for processor utilization. The throttle control 1320 limits the rate of processor utilization by a grid node if the rate of processor utilization exceeds the expected processor utilization threshold for the grid job, so that the grid node processing of non-grid jobs is not negatively affected by grid jobs executing at the grid node.

The expected network and processor availability values are determined based on the scheduling of the grid jobs as determined by the grid job scheduler, the grid project visualization and simulation engine, or optionally a combination of the grid job scheduler and the grid project visualization and simulation engine. The grid project throttle control 1320 also operates to make a determination as to network and processor utilization at a grid node attributable to grid work and non-grid work. The throttle control 1320 may make this determination based upon the task identification, or other means known in the art. The throttle control also collects statistics on system usage, such as processor and network usage for grid and non-grid work. Statistics regarding processor utilization and network utilization are collected from processor utilization monitors and network utilization monitors located on the grid nodes. The throttle control 1320 can subtract out the grid contribution to the grid node work load.

The throttling mechanism provides a further benefit in that this throttling mechanism provides a mechanism through which network activity monitors associated with the grid agents may categorize network traffic into grid and non-grid categories, as previously discussed above. That is, since the network interfaces throttle the network traffic emanating from the grid node, the network activity monitors know that the network traffic associated with grid jobs cannot be greater than the established expected network availability threshold. Thus, if the network link is operating at full capacity, then the maximum that may be attributable to grid jobs is the throttling threshold. In these embodiments, full capacity is, for example, all of the bandwidth consumed.

FIGS. 14-16 are flowcharts outlining the various operations of some of the embodiments of the present invention previously described above. It will be understood that each step of the flowchart illustrations, and combinations of steps in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart step or steps These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart step or steps.

Accordingly, steps of the flowchart illustrations support combinations of means for performing the specified functions, combinations of steps for performing the specified functions and program instruction means for performing the specified functions. It will also be understood that each step of the flowchart illustrations, and combinations of steps in the flowchart illustrations, can be implemented by special purpose hardware-based computer systems which perform the specified functions or steps, or by combinations of special purpose hardware and computer instructions.

FIG. 14 is a flowchart outlining an exemplary operation for generating a visual representation of a simulation of a grid project in accordance with one exemplary embodiment of the present invention. As shown in the flowchart 1400 of FIG. 14, a request is received from a user for a simulation of execution of a grid project over a particular period of time at step 1410. A request may be made for the user to enter or select the parameters for the requested grid project simulation at step 1420 by providing the user with a GUI requesting a grid project identifier, a start date, a start time, an end date, an end time, a statistical basis for the simulation, the type of graphical presentation, and/or any other additional parameters.

The simulation of the grid project is generated based upon the parameters entered by the user and the network availability and processor availability data. At step 1430, network and processor availability data is retrieved from the network and processor availability data storage system. A resource availability plot is generated at step 1440 based upon the processor/network availability data. The resource availability plot at step 1440 and, optionally, information from a grid project model description, as described above, is used to generate a simulation of execution of grid project, at step 1450.

FIG. 15 is a flowchart outlining an exemplary operation for scheduling the dispatching of grid jobs in accordance with one exemplary embodiment of the present invention. As shown in the flowchart 1500 of FIG. 15, grid management system receives a grid project submission at step 1510. The network nature of the grid project is determined at step 1515. At step 1520, grid node clusters are generated utilizing a network clustering algorithm. Any known network clustering algorithm for determining clusters of grid nodes may be utilized to generate grid node clusters.

A determination of average resource availability is made at step 1525, regarding network and processor availability for each cluster. At step 1530, each cluster of grid nodes is ranked according to the averages of the processor and network resource availability.

A minimum threshold value for processor capacity and a minimum threshold value for network capacity are determined at step 1535. The minimum threshold values may be selected by the user or by a specification in the grid project. At step 1540 a determination is made as to whether a grid node cluster exceed both processor and network minimum threshold values and has sufficient total network and processor capacity to execute the grid job. Grid nodes that exceed both minimum thresholds and have sufficient capacity may be selected. Step 1545 schedules the grid project in accordance with the selected grid node clusters.

If no clusters satisfy the requirements of step 1540, then the minimum threshold values are adjusted downward at step 1555 to permit evaluation of additional clusters. The process may be repeated until a cluster that satisfies the requirements of step 1540 is identified and scheduling can occur at step 1545 or until additional recalculations result in diminished or reduced returns at step 1550, in which case an indication is provided to the user that scheduling cannot be accomplished at step 1560.

FIG. 16 is a flowchart outlining an exemplary operation for throttling the network traffic associated with a grid project in accordance with one exemplary embodiment of the present invention. As shown in the flowchart 1600 of FIG. 16, the expected network availability and expected processor availability threshold is determined at step 1610. If the rate of data transmission exceeds the expected network availability threshold at step 1620, the throttle control throttles the rate of data transmission at step 1630. If the rate of processor utilization exceeds the expected processor availability threshold at step 1640, then the throttle control throttles the rate of processor utilization for processing grid jobs back down to the expected processor availability at step 1650.

The throttle control also collects statistics on system usage of processor and network resources. The throttle control is capable of subtracting out the grid job's contribution to the processor and network load. The throttle control can identify grid work by task identification or other means known in the art. The throttle control will only throttle processor and network activity associated with grid work. In this manner, the grid project throttle control program associated with the grid agent on a grid node controls the rate of network/processor utilization at the grid node to prevent grid jobs from interfering with the execution of non-grid work.

It is important to note that while the present invention has been described in the context of a fully functioning data processing system, those of ordinary skill in the art will appreciate that the processes of the present invention are capable of being distributed in the form of a computer usable medium of instructions and a variety of forms and that the present invention applies equally regardless of the particular type of signal bearing media actually used to carry out the distribution.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method comprising:
    sending a set of parameters to an application at a grid node, wherein the application supports control of data transmission based on the set of parameters, wherein the set of parameters includes an expected network availability threshold and an expected processor availability threshold;
    controlling a rate of data transmission, for data generated by processing a grid job at the grid node, to be between a minimum threshold value and a maximum threshold value for a network capacity based on the rate of data transmission and the set of parameters;
    limiting the rate of data transmission by a throttling mechanism at the grid node in response to the rate of data transmission exceeding the expected network availability threshold; and
    limiting a rate of processor utilization by the throttling mechanism in response to the rate of processor utilization exceeding the expected processor availability threshold.

2. The computer implemented method of claim 1 further comprising receiving the expected network availability threshold packaged into a wrapper associated with the grid job or grid job data.

3. The computer implemented method of claim 1 further comprising collecting statistics on network utilization from a network utilization monitor on the grid node.

4. The computer implemented method of claim 1 further comprising determining network utilization attributable to grid work and non-grid work.

5. A computer program product comprising:
    a computer readable storage device;
    first program instructions to send a set of parameters to an application at a grid node, wherein the application supports control of data transmission based on the set of parameters, wherein the set of parameters includes an expected network availability threshold and an expected processor availability threshold;
    second program instructions to control a rate of data transmission, for data generated by processing a grid job at the grid node, to be between a minimum threshold value and a maximum threshold value for a network capacity based on the rate of data transmission and the set of parameters;
    third program instructions to limit the rate of data transmission by a throttling mechanism at the grid node in response to the rate of data transmission exceeding the expected network availability threshold; and
    fourth program instructions to limit a rate of processor utilization by the throttling mechanism in response to the rate of processor utilization exceeding the expected processor availability threshold;
    wherein the first through the fourth program instructions are stored in the computer readable storage device.

6. The computer program product of claim 5 further comprising:
    fifth program instructions to limit the rate of data transmission if the rate of data transmission exceeds the expected network availability threshold set forth in the set of parameters;
    wherein the fifth program instructions are stored in the computer readable storage device.

7. The computer program product of claim 5 further comprising:
    fifth program instructions to determine whether the grid node has an application that supports controlling data transmission based on the set of parameters; and sixth program instructions to send the set of parameters to the application on the grid node responsive to the application being present on the grid node;
wherein the fifth and sixth program instructions are stored in the computer readable storage device.

8. The computer program product of claim 5 further comprising:
fifth program instructions to receive the expected network availability threshold and the expected processor availability threshold packaged into a wrapper associated with the grid job or grid job data;
wherein the fifth program instructions are stored in the computer readable storage device.

9. The computer program product of claim 5 further comprising:
fifth program instructions to collect statistics on network utilization from a network utilization monitor on the grid node;
wherein the fifth program instructions are stored in the computer readable storage device.

10. The computer program product of claim 5 further comprising:
fifth program instructions to determine a network utilization and a processor utilization attributable to grid work and to non-grid work;
wherein the fifth program instructions are stored in the computer readable storage device.

11. The computer program product of claim 5 further comprising:
fifth program instructions to collect statistics on processor utilization from a processor utilization monitor of the grid node;
wherein the fifth program instructions are stored in the computer readable storage device.

12. The computer program product of claim 5 further comprising:
fifth program instructions to determine whether the rate of data transmission attributable to grid work exceeds the expected network availability threshold for data transmission;
wherein the fifth program instructions are stored in the computer readable storage device.

13. The computer program product of claim 5 further comprising:
fifth program instructions to determine processor utilization attributable to grid workloads and non-grid workloads:
sixth program instructions to compare processor utilization data to identifiers associated with grid jobs being processed by the grid node;
wherein the fifth and sixth program instructions are stored in the computer readable storage device.

14. An apparatus for controlling execution of grid jobs on a grid node comprising:
a computer having a processor and a computer readable memory operably coupled to a bus;
a computer readable storage device operably coupled to the bus;
first program instructions to send a set of parameters to an application at the grid node, wherein the application supports control of data transmission based on the set of parameters, wherein the set of parameters includes an expected network availability threshold and an expected processor availability threshold;
second program instructions to control a rate of data transmission, for data generated by processing a grid job at the grid node, to be between a minimum threshold value and a maximum threshold value for a network capacity based on the rate of data transmission and the set of parameters;
third program instructions to limit the rate of data transmission by a throttling mechanism at the grid node in response to the rate of data transmission exceeding the expected network availability threshold; and
fourth program instructions to limit a rate of processor utilization by the throttling mechanism in response to the rate of processor utilization exceeding the expected processor availability threshold;
wherein the first through the fourth program instructions are stored in the computer readable storage device for execution by the processor via the computer readable memory.

15. The apparatus of claim 14 further comprising:
fifth program instructions to determine whether the rate of processor utilization attributable to grid work exceeds the expected processor availability threshold;
wherein the fifth program instructions are stored in the computer readable storage device for execution by the processor via the computer readable memory.

16. The apparatus of claim 14 further comprising:
fifth program instructions to determine whether the rate of data transmission attributable to grid work exceeds the expected network availability threshold;
wherein the fifth program instructions are stored in the computer readable storage device for execution by the processor via the computer readable memory.

* * * * *